(12) United States Patent
Sugiyama et al.

(10) Patent No.: US 12,025,523 B2
(45) Date of Patent: Jul. 2, 2024

(54) PRESSURE SENSING DEVICE AND STYLUS

(71) Applicant: Wacom Co., Ltd., Saitama (JP)

(72) Inventors: Yoshihisa Sugiyama, Saitama (JP); Ken Suzuki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 347 days.

(21) Appl. No.: 17/489,563

(22) Filed: Sep. 29, 2021

(65) Prior Publication Data

US 2022/0018725 A1 Jan. 20, 2022

Related U.S. Application Data

(63) Continuation of application No. PCT/JP2019/049997, filed on Dec. 20, 2019.

(30) Foreign Application Priority Data

Apr. 3, 2019 (JP) .................................. 2019-071570

(51) Int. Cl.
   *G01L 5/16* (2020.01)
   *G01L 5/1627* (2020.01)
   *G06F 3/0354* (2013.01)

(52) U.S. Cl.
   CPC ........ *G01L 5/1627* (2020.01); *G06F 3/03545* (2013.01)

(58) Field of Classification Search
   CPC ... G01L 5/1627; G01L 1/225; G06F 3/03545; G06F 3/0383; G06F 3/046
   See application file for complete search history.

(56) References Cited

U.S. PATENT DOCUMENTS 4,111,052 A * 9/1978 Sniderman .......... G06F 3/03545
                                                  73/862.541
4,896,543 A   1/1990 Gullman
(Continued)

FOREIGN PATENT DOCUMENTS

JP    2010-164495 A    7/2010
JP    6084393 B2       2/2017
(Continued)

OTHER PUBLICATIONS

International Search Report, dated Jan. 21, 2020, for International Application No. PCT/JP2019/049997, 4 pages. (with English Translation).

*Primary Examiner* — Francis C Gray
(74) *Attorney, Agent, or Firm* — Seed IP Law Group LLP

(57) ABSTRACT

There is provided a pressure sensing device including a plate-shaped member, plural strain sensitive materials arranged on the plate-shaped member, and a connection electrode electrically connected to a predetermined circuit. The plate-shaped member includes a surface portion having a center portion that receives force applied to a tip portion of a stylus. The plural strain sensitive materials include first and second strain sensitive materials arranged at different distances from the center portion of the surface portion of the plate-shaped member. The plural strain sensitive materials are formed on at least one surface portion of the plate-shaped member along with a conductive pattern that connects the first and second strain sensitive materials. The connection electrode is electrically connected to the plural strain sensitive materials, and the connection electrode is crimped and electrically connected to the predetermined circuit housed in the stylus.

13 Claims, 9 Drawing Sheets

(56) References Cited

U.S. PATENT DOCUMENTS

| | | | | |
|---|---|---|---|---|
| 5,548,092 | A | * | 8/1996 | Shriver ................ G06F 3/0346 178/19.01 |
| 5,981,883 | A | * | 11/1999 | Shriver ............... G06F 3/03545 178/18.01 |
| 9,322,732 | B2 | | 4/2016 | Marrota et al. |
| 2016/0188013 | A1 | * | 6/2016 | Yoneoka ............ G06F 3/03545 345/174 |
| 2020/0142507 | A1 | * | 5/2020 | Hara ....................... G01L 5/161 |

FOREIGN PATENT DOCUMENTS

| | | | | | |
|---|---|---|---|---|---|
| JP | 2019016038 | A | * | 1/2019 | |
| WO | WO-2019008839 | A1 | * | 1/2019 | ........... G01L 5/0038 |
| WO | WO-2020202662 | A1 | * | 10/2020 | ........... G01L 5/1627 |

* cited by examiner

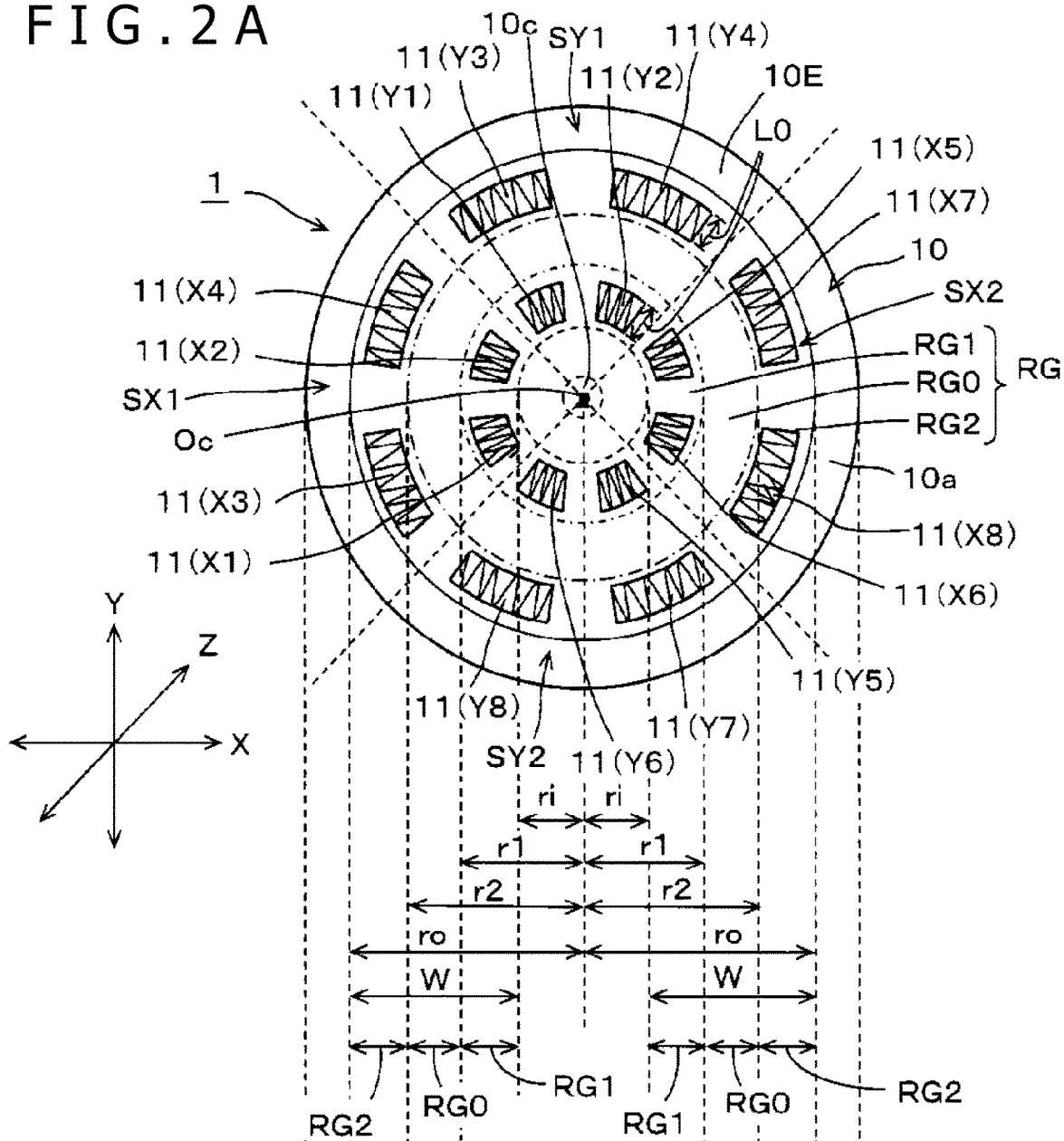
FIG. 2A
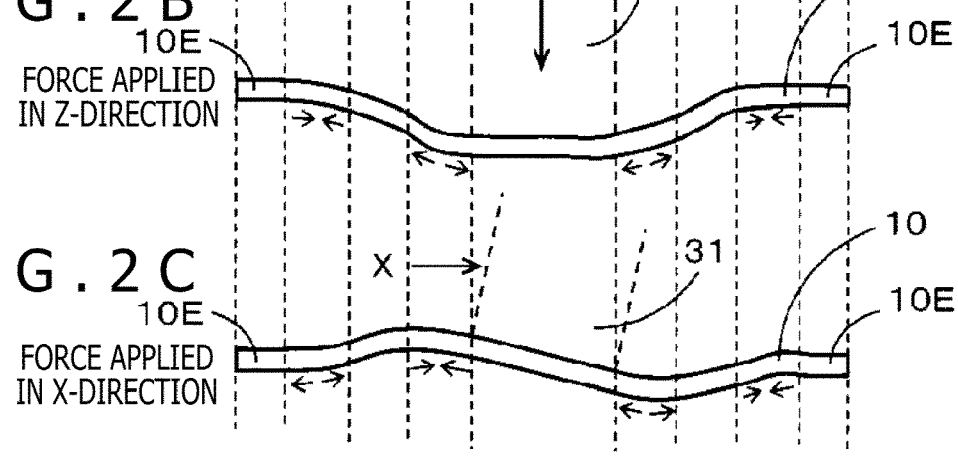
FIG. 2B
FORCE APPLIED IN Z-DIRECTION
FIG. 2C
FORCE APPLIED IN X-DIRECTION FIG.3A
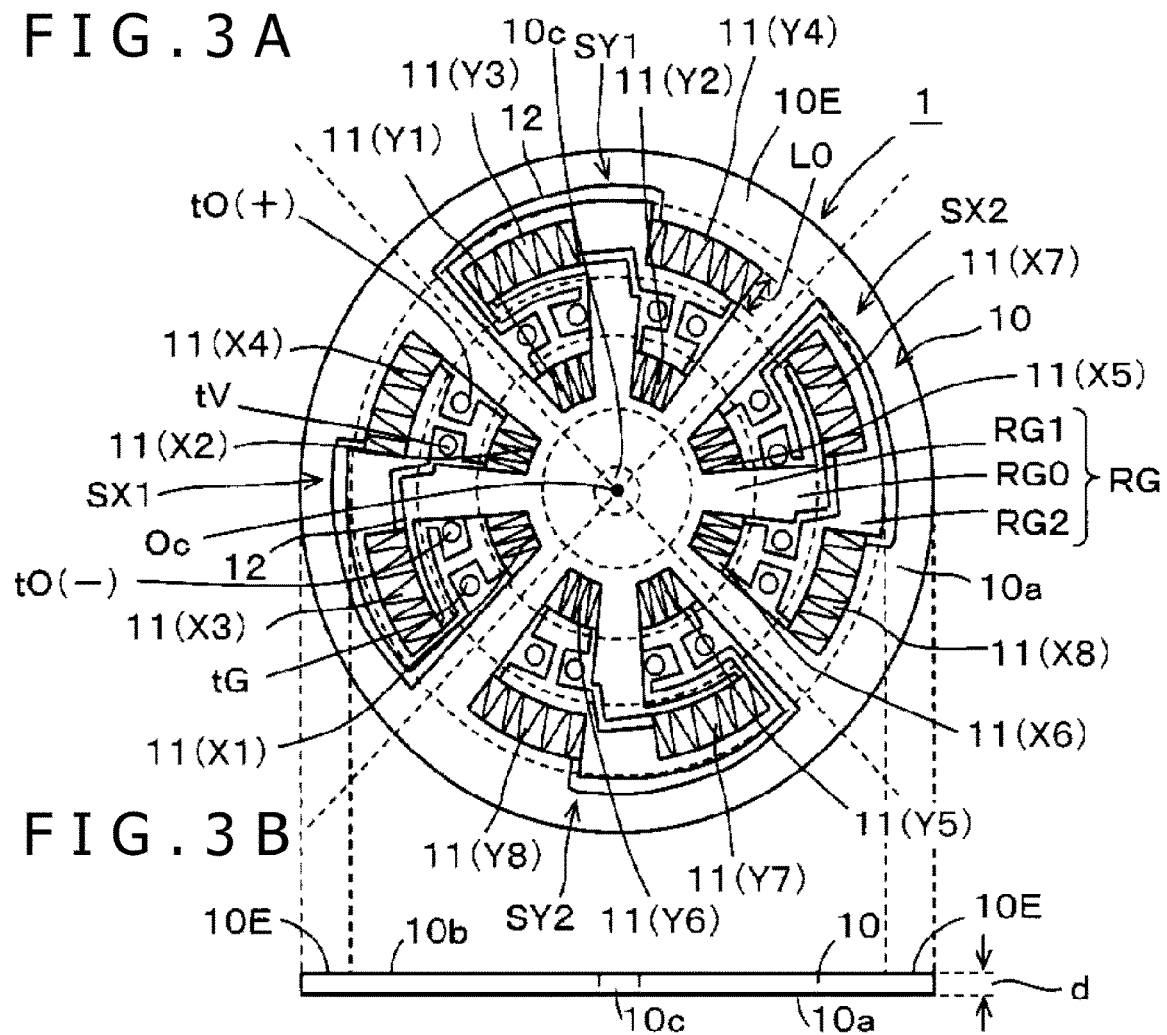
FIG.3B
FIG.4
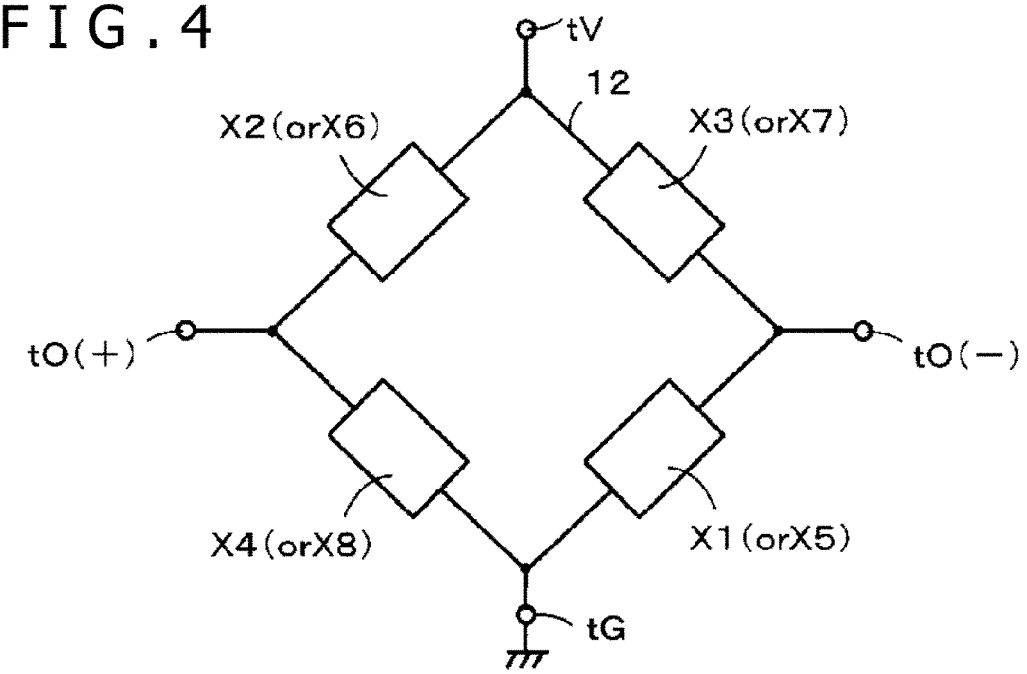

(Priot Art)

(Priot Art)

(Priot Art)

(Priot Art)

PRESSURE SENSING DEVICE AND STYLUS

BACKGROUND

Technical Field

The present disclosure relates to a pressure sensing device that detects received force, based on detection of deviation, such as strain, generated according to the received force. The present disclosure also relates to a stylus that uses the pressure sensing device to detect force applied to, for example, a core body.

Background Art

A stylus (electronic pen) sometimes includes a pen pressure detection unit that detects contact with an input surface of a position detection sensor or detects pressure (pen pressure) during contact, and a pen pressure detection sensor that uses a strain gauge is also proposed (see U.S. Pat. Nos. 5,548,092 and 9,322,732). The strain gauge uses a phenomenon that the electrical resistance of a strain sensitive material is changed by strain (not only elastic strain, but also plastic strain) of the strain sensitive material.

As a pressure detection member with a strain gauge, what is generally called a 3-axis pressure detection member is also proposed, the 3-axis pressure detection member being configured to detect force components of applied force (pressure) in three axis directions (X-axis direction, Y-axis direction, and Z-axis direction) orthogonal to each other (see Japanese Patent Laid-Open No. 2010-164495 and U.S. Pat. No. 4,896,543). When the 3-axis pressure detection member is used in the stylus, the 3-axis pressure detection member can detect not only the pressure (pen pressure) in the axial direction of the stylus, but also the force applied to the pen tip of the stylus even when the stylus is tilted by a predetermined angle. The 3-axis pressure detection member is useful in that it can detect the tilt angle of the stylus, the friction force at the pen tip of the stylus, and the like.

FIGS. 8A and 8B illustrate an example of the 3-axis pressure detection member. The pressure detection member of the example includes an elastic portion 101, a force reception portion 102 integrated and coupled to the elastic portion 101, and a pressure sensing device 103 attached to the elastic portion 101. The pressure sensing device 103 includes a strain gauge and detects force components in X, Y, and Z axis directions of the force applied to the force reception portion 102, where the Z-axis direction in the example is a direction orthogonal to the plane of the elastic portion 101, and the X-axis and Y-axis directions are directions parallel to the plane of the elastic portion 101 and orthogonal to each other.

FIG. 8A is a perspective view of the pressure detection member in the example. FIG. 8B is a vertical cross-sectional view of the pressure detection member in the example (cross-sectional view of directions including the Z-axis direction). Note that FIG. 8B illustrates the force reception portion 102 only near the elastic portion 101, for convenience.

The force reception portion 102 has a function of receiving force applied to a tip portion on the side opposite to the side coupled to the elastic portion 101 and transmitting the force to the elastic portion 101. The force reception portion 102 is a rod-like member in the example.

The elastic portion 101 includes a thin disk-shaped diaphragm 101a provided on one opening side of a cylindrical diaphragm holding portion 101b as illustrated in FIG. 8B. The elastic portion 101 is coupled to the rod-like force reception portion 102 at the center part of the disk-shaped diaphragm 101a.

An adhesive is used to paste and attach the pressure sensing device 103 to a surface of the diaphragm 101a on the side opposite to the side coupled to the force reception portion 102.

The pressure sensing device 103 of the example includes a plurality of strain sensitive materials, in which resistance values change according to received strain deviation, the plurality of strain sensitive materials arranged on a flexible board 103a including, for example, a disk-shaped insulating film sheet.

In the example illustrated in FIG. 9A, the strain sensitive materials arranged on the flexible board include eight strain sensitive materials 104X1, 104X2, 104Y1, 104Y2, 104Z1, 104Z2, 104Z3, and 104Z4. In the example, the resistance values of the strain sensitive materials 104X1, 104X2, 104Y1, 104Y2, 104Z1, 104Z2, 104Z3, and 104Z4 are equal to each other when strain is not applied.

The strain sensitive materials 104X1 and 104X2 detect strain in the X-axis direction that is a direction orthogonal to the axial direction of the force reception portion 102. The strain sensitive materials 104X1 and 104X2 are provided on both sides across a center position 103ac (application position of force) of the flexible board 103a on a line in the X-axis direction passing through the center position 103ac, at positions equidistant from the center position 103ac. Note that, in the following description, a plurality of strain sensitive materials will be referred to as strain sensitive materials 104 when they do not have to be distinguished one from another.

The strain sensitive materials 104Y1 and 104Y2 detect strain in the Y-axis direction that is a direction orthogonal to the axial direction of the force reception portion 102 and orthogonal to the X-axis direction. The strain sensitive materials 104Y1 and 104Y2 are provided on both sides across the center position 103ac on a line in the Y-axis direction passing through the center position 103ac, at positions equidistant from the center position 103ac.

The strain sensitive materials 104Z1, 104Z2, 104Z3, and 104Z4 detect strain in the Z-axis direction that is the axial direction of the force reception portion 102. In the example of FIG. 9A, the strain sensitive materials 104Z1, 104Z2, 104Z3, and 104Z4 are provided on both sides across the center position 103ac on a line passing through the center position 103ac, the line being tilted by a predetermined angle with respect to the X-axis direction and the Y-axis direction such that the strain sensitive materials 104Z1, 104Z2, 104Z3, and 104Z4 do not overlap the other strain sensitive materials 104X1, 104X2, 104Y1, and 104Y2. Two strain sensitive materials 104Z1 and 104Z3 and two strain sensitive materials 104Z2 and 104Z4 are provided at point-symmetric positions.

The temperature constant of a Cu—Ni alloy as an example of the material of the plurality of strain sensitive materials 104 is linear and stable, and bridge circuits can cancel out the temperature conversions of the resistance values of the strain sensitive materials. Therefore, the Cu—Ni alloy is stable to the temperature change and is sometimes used in the related art. Other examples of the strain sensitive materials 104 include carbon, silicon, magnesium, a Cr thin film, and a Cr—N thin film of a semiconductor (see Japanese Patent No. 6084393).

When the strain sensitive materials 104 contain, for example, a Cu—Ni alloy, thin metal wires and metal foils of the strain sensitive materials 104 are folded in a zig-zag pattern with a length L set in the radius direction (strain generation direction), and the thin metal wires and metal foils are arranged in a direction (circumferential direction) orthogonal to the radius direction as illustrated in an enlarged view of FIG. 9B. Although FIG. 9B illustrates an example of the strain sensitive material 104Y1, this similarly applies to the other strain sensitive materials 104X1, 104X2, 104Y2, 104Z1, 104Z2, 104Z3, and 104Z4.

The demand for miniaturization of a stylus of recent years is increasing. Therefore, the demand for further downsizing a pressure sensing device used for the purpose of detecting the pen pressure and the tilt is also increasing. However, in the structure of the pressure sensing device 103 described with reference to FIGS. 8A to 9B, a feeder wiring area and a connection terminal are arranged on the outer circumference of the pressure sensing device 103. The feeder wiring area and the connection terminal arranged on the outer circumference inhibit the downsizing.

BRIEF SUMMARY

An object of the present disclosure is to provide a pressure sensing device that can solve the problem described above and a stylus including the pressure sensing device.

To solve the problem described above, provided is a pressure sensing device housed in a housing of a stylus in a pen shape, the stylus including a tip portion protruding from an end of the housing and a predetermined circuit, the pressure sensing device configured to sense force applied to the tip portion, the pressure sensing device housed in the housing of the stylus and electrically connected to the predetermined circuit, the pressure sensing device including: a plate-shaped member; a plurality of strain sensitive materials arranged in the plate-shaped member; and a connection electrode for electrical connection to the predetermined circuit, in which the plate-shaped member includes a surface portion having a center portion that receives force applied to the tip portion, the plurality of strain sensitive materials include at least a first strain sensitive material separated by a first distance from the center portion of the surface portion of the plate-shaped member, and a second strain sensitive material separated by a second distance larger than the first distance from the center portion of the surface portion of the plate-shaped member, the strain sensitive materials are formed on at least part of the surface portion of the plate-shaped member along with a conductive pattern that connects the first strain sensitive material and the second strain sensitive material, and the strain sensitive materials are configured to detect strain generated in the plate-shaped member according to the force transmitted to the surface portion of the plate-shaped member, and the connection electrode is electrically connected to the plurality of strain sensitive materials, and the connection electrode is crimped and electrically connected to the predetermined circuit housed in the stylus.

Further, provided is a stylus in a pen shape, the stylus including: a tip portion protruding from an end of a housing; a pressure sensing device configured to sense force applied to the tip portion; and a predetermined circuit electrically connected to the pressure sensing device, in which the pressure sensing device includes a plate-shaped member, a plurality of strain sensitive materials arranged in the plate-shaped member, and a connection electrode electrically connected to the predetermined circuit, the plate-shaped member includes a surface portion having a center portion that receives force applied to the tip portion, the plurality of strain sensitive materials include at least a first strain sensitive material separated by a first distance from the center portion of the surface portion of the plate-shaped member, and a second strain sensitive material separated by a second distance larger than the first distance from the center portion of the surface portion of the plate-shaped member, the strain sensitive materials are formed on at least part of the surface portion of the plate-shaped member along with a conductive pattern that connects the first strain sensitive material and the second strain sensitive material, and the strain sensitive materials are configured to detect strain generated in the plate-shaped member according to the force transmitted to the surface portion of the plate-shaped member, and the connection electrode is electrically connected to the plurality of strain sensitive materials, and the connection electrode is crimped and electrically connected along an axial direction of the stylus to the predetermined circuit housed in the stylus.

In the pressure sensing device configured as described above, the strain sensitive materials include the first strain sensitive material separated by the first distance from the center portion of the surface portion of the plate-shaped member, and the second strain sensitive material separated by the second distance larger than the first distance from the center portion. The strain sensitive materials are formed on the surface portion of the plate-shaped member along with the conductive pattern for connecting the first strain sensitive material and the second strain sensitive material.

The connection electrode is electrically connected to the plurality of strain sensitive materials, and the connection electrode is crimped and electrically connected along the axial direction of the stylus to the predetermined circuit housed in the stylus. Therefore, the connection electrode and the predetermined circuit housed in the stylus can easily be connected.

BRIEF DESCRIPTION OF THE DRAWINGS

FIGS. 2A to 2C are diagrams for describing a configuration example of an embodiment of a pressure sensing device according to the present disclosure;

FIGS. 3A and 3B are diagrams for describing a configuration example of the embodiment of the pressure sensing device according to the present disclosure;

FIG. 4 is a circuit diagram illustrating an example of a circuit applied to the embodiment of the pressure sensing device according to the present disclosure;

DETAILED DESCRIPTION

An embodiment of a pressure sensing device and an embodiment of a stylus according to the present disclosure will now be described with reference to the drawings. The stylus of the embodiment described below is an electromagnetic resonance stylus. The stylus uses an electromagnetic resonance system to transmit and receive signals to and from a position detection sensor of a position detection apparatus, and the position detection apparatus detects an instruction position of the stylus.

<Description of Embodiment of Stylus>

Figure 1A:
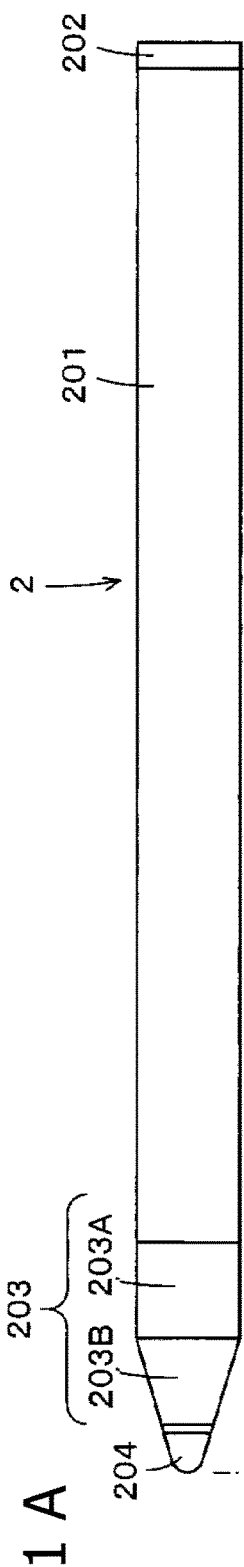
FIGS. 1A and 1B are diagrams for describing a configuration example of an embodiment of a stylus according to the present disclosure.
Figure 1B:
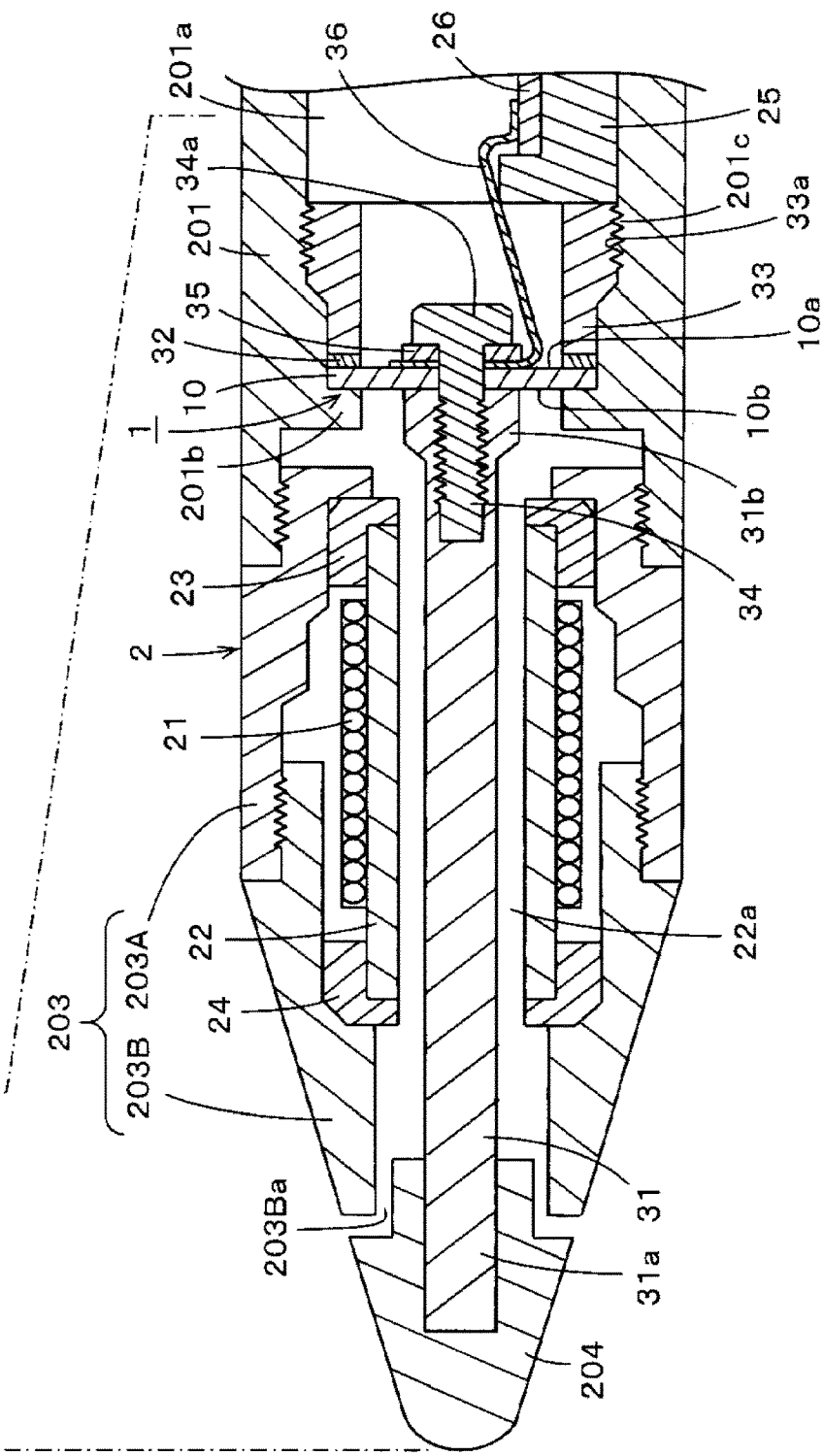

FIGS. 1A and 1B depict an example of a structure of a stylus 2 of the embodiment including a pressure sensing device 1 of the embodiment of the present disclosure for detecting the pen pressure, the tilt, and the like. FIG. 1A depicts an appearance of the stylus 2, and FIG. 1B is a cross-sectional view of a part on a pen tip side of the stylus 2.

As illustrated in FIG. 1A, one opening side of an elongated cylindrical housing 201 in the axial direction in the stylus 2 of the embodiment is the pen tip side, and the other opening side is a back end side. The back end side of the housing 201 in the axial direction is blocked by a back end cap member 202. The housing 201 contains stainless steel (SUS) in the example. The housing 201 may contain resin.

A magnetic core, which is a ferrite core 22 in the example, is arranged on the pen tip side of the cylindrical housing 201 of the stylus 2 in the embodiment as illustrated in FIG. 1B. A coil 21 included in a resonant circuit for electromagnetic induction coupling to the position detection sensor is wound around the ferrite core 22. The pressure sensing device 1 is fixed and arranged in a hollow portion 201a of the housing 201.

A pen tip side member 203 is attached to an opening of the housing 201 on the pen tip side in the stylus of the embodiment. In the example, the pen tip side member 203 includes a coil case 203A that is a cylindrical tubular body and a front cap 203B including a tapered tubular body. The coil case 203A contains non-magnetic material which is resin in the example. The front cap 203B also contains resin in the example. The coil case 203A and the front cap 203B are screwed with each other in the axial direction as illustrated in FIG. 1B to form a housing space of the ferrite core 22 around which the coil 21 is wound.

As the coil case 203A is screwed to the housing 201, the pen tip side member 203 is attached to the housing 201. As illustrated in FIG. 1B, a first cushioning member 23 and a second cushioning member 24 are attached to both ends in the axial direction of the ferrite core 22 around which the coil 21 is wound, and the ferrite core 22 is housed in the housing space of the pen tip side member 203. The first cushioning member 23 and the second cushioning member 24 include elastic members, such as rubber.

A through hole 22a in the axial direction into which a rod-like core body 31 is inserted is formed at a center position of the ferrite core 22. The core body 31 contains hard material, which is SUS in the example, and one end 31a of the core body 31 in the axial direction protrudes from an opening 203Ba of the front cap 203B. A pen tip member 204 containing resin in the example is pressed, fitted, and attached to the protruding end 31a.

Another end 31b on the side opposite to the end 31a provided with the pen tip member 204 of the core body 31 is coupled to the pressure sensing device 1 as described later. Therefore, the core body 31 in the example includes a force reception portion that receives force applied to the pen tip member 204 and has a function of transmitting the received force to the pressure sensing device 1.

The pressure sensing device 1 of the embodiment includes a plurality of strain sensitive materials 11 arranged in a zig-zag pattern on one surface portion 10a of a disk-shaped plate-shaped member 10 and includes circuits (bridge circuits) including the plurality of strain sensitive materials 11 and a conductive pattern 12 as illustrated in FIGS. 2A to 3B described later.

The pressure sensing device 1 is attached in the hollow portion 201a of the housing 201 in a state in which the surface direction of the surface portion 10a of the pressure sensing device 1 faces a direction orthogonal to the axial direction of the housing 201 as illustrated in FIG. 1B. The pressure sensing device 1 is fixed to the housing 201 such that the pressure sensing device 1 cannot move in the axial direction and cannot move in the circumferential direction of the pressure sensing device 1.

In the example of FIG. 1B, a ring-shaped projection portion 201b further projecting inside of the diameter of the plate-shaped member 10 of the pressure sensing device 1 is formed in the hollow portion 201a of the housing 201. The pressure sensing device 1 is inserted into the hollow portion 201a of the housing 201 from the back end side, and a peripheral portion of a surface portion 10b on the side opposite to the surface portion 10a of the plate-shaped member 10 of the pressure sensing device 1 comes into contact with the ring-shaped projection portion 201b.

As illustrated in FIG. 1B, a ring-shaped washer member 32 is arranged on a peripheral portion on the surface portion 10a side of the plate-shaped member 10 of the pressure sensing device 1, and then a cylindrical sensor holder 33 is screwed into a screw portion 201c formed on an inner wall surface of the hollow portion 201a of the housing 201. A screw portion 33a screwed to the screw portion 201c of the housing 201 is formed on an outer circumferential side surface portion of the cylindrical sensor holder 33.

As the sensor holder 33 is screwed into the housing 201, the peripheral portion of the plate-shaped member 10 of the pressure sensing device 1 is placed between the ring-shaped projection portion 201b of the housing 201 and a ring-shaped end surface at the tip of the sensor holder 33 through the washer member 32. The pressure sensing device 1 is fixed in the hollow portion 201a of the housing 201 such that the pressure sensing device 1 cannot move in the axial direction and cannot rotate in the circumferential direction.

As illustrated in FIG. 1B, a coupling screw 34 is screwed from the surface portion 10a of the plate-shaped member 10 while the other end 31b side of the core body 31 is in contact with the center part of the surface portion 10b of the plate-shaped member 10 of the pressure sensing device 1, and the core body 31 is coupled to the center part of the surface portion 10b of the plate-shaped member 10.

In this case, as illustrated in FIG. 1B, a flexible board 36 for electrical connection of a washer member 35 and a terminal of a circuit of the pressure sensing device 1 formed on the surface portion 10a is placed between a screw head 34a of the coupling screw 34 and the surface portion 10a of the plate-shaped member 10. More specifically, the flexible board 36 is crimped to and electrically connected to the terminal of the circuit formed on the surface portion 10a of the plate-shaped member 10 through the washer member 35 when the plate-shaped member 10 of the pressure sensing device 1 and the core body 31 are coupled through the coupling screw 34. Note that a through hole 10c with the same diameter as the diameter of the coupling screw 34 is formed on the center part of the plate-shaped member 10 of the pressure sensing device 1 as illustrated in FIGS. 2A to 3B.

The side opposite to the side coupled to the pressure sensing device 1 of the flexible board 36 is electrically connected by soldering or the like to a conductive pattern of a printed circuit board 26 held by a board holder 25 provided in the hollow portion 201a of the housing 201 as illustrated in FIG. 1B. Although not illustrated, both ends of the coil 21 wound around the ferrite core 22 are electrically connected to both ends of a capacitor provided on the printed circuit board 26, and the coil 21 and the capacitor provide a resonant circuit for electromagnetic induction coupling to the position detection sensor.

The stylus 2 of the embodiment is configured in this way. Therefore, the pen tip member 204 of the stylus 2 comes into contact with the input surface of the position detection sensor of the position detection apparatus, and strain deformation of the plate-shaped member 10 of the pressure sensing device 1 occurs according to the force applied to the core body 31 through the pen tip member 204.

The resistance value of the strain sensitive material arranged on the surface portion 10a of the pressure sensing device 1 changes according to the strain deformation, and an output voltage corresponding to the applied force is obtained at the terminal of the circuit (bridge circuit) formed on the surface portion 10a.

The printed circuit board 26 in the embodiment is provided with a pen state detection circuit that detects the pen pressure applied to the pen tip member 204 from force components applied in the axial direction of the core body 31 and that detects the tilt angle of the stylus 2 with respect to the input surface of the position detection sensor from force components applied in a direction orthogonal to the axial direction of the core body 31. The pen state detection circuit detects the pen pressure and the tilt based on the output voltage of the pressure sensing device 1 transmitted through the flexible board 36. Note that the pen state detection circuit may also be configured to detect the friction force between the pen tip member 204 of the stylus 2 and the input surface of the position detection sensor based on the output voltage of the pressure sensing device 1.

<Description of Embodiment of Pressure Sensing Device>

FIGS. 2A to 3B are diagrams for describing a configuration example of the pressure sensing device 1 of the embodiment of the present disclosure. As described above, the pressure sensing device 1 of the example includes the plurality of strain sensitive materials 11 arranged on the surface portion 10a of the plate-shaped member 10 including an elastic insulating member. FIGS. 2A to 2C illustrate a relation between arrangement positions of the plurality of strain sensitive materials 11 arranged on the surface portion 10a of the plate-shaped member 10 of the pressure sensing device 1 of the embodiment and strain generated in the plate-shaped member 10 according to the applied force. Although the conductive pattern 12 for electrical connection of the plurality of strain sensitive materials 11 is also formed along with the plurality of strain sensitive materials 11 on the surface portion 10a of the plate-shaped member 10 as illustrated in FIG. 3A, the conductive pattern 12 is not illustrated in FIG. 2A.

FIGS. 2A and 3A depict the pressure sensing device 1 viewed from the surface portion 10a side in the direction orthogonal to the surface portion 10a of the plate-shaped member 10. FIG. 3B is a side view of the pressure sensing device 1 from the direction parallel to the surface portion of the plate-shaped member 10. As illustrated in FIG. 3B, the plate-shaped member 10 includes a circular plate with a constant thickness d in the example.

In the pressure sensing device 1 of the embodiment, the plate-shaped member 10 includes a plate containing elastic material, such as a metal plate, which is SUS in the example. In the example, an insulating layer (not illustrated) is provided on the surface portion 10a side of the plate-shaped member 10 to provide an insulating member. The strain sensitive materials 11 and the conductive pattern 12 are formed on the insulating layer on the surface portion 10a side of the plate-shaped member 10 to form bridge circuits in the embodiment, and the pressure sensing device 1 is formed. The configuration of the pressure sensing device 1 of the embodiment is not a configuration in which the flexible board provided with the strain sensitive materials is glued by an adhesive to the elastic body of the diaphragm as in the existing techniques. Therefore, the pressure sensing device 1 can prevent problems, such as change over time (creep) and variation of strain sensitive characteristics, caused by the adhesive as in the existing techniques.

As described above, a peripheral portion 10E of the plate-shaped member 10 of the pressure sensing device 1 is placed between the ring-shaped projection portion of the housing 201 and the sensor holder 33 in the example, and the plate-shaped member 10 is fixed so that the plate-shaped member 10 cannot move in the axial direction and the circumferential direction. The coupling screw 34 is used to screw and couple the core body 31 at the center part of the plate-shaped member 10. Therefore, a ring-shaped region RG with a width W between the position of the periphery of the head portion 34a of the coupling screw 34 and the position of the inner diameter of the sensor holder 33 is a region in which elastic strain can be generated according to the force applied to the pen tip member 204 of the core body 31 as illustrated in FIG. 1B.

More specifically, the ring-shaped region RG, in which a radius r from a center position Oc in the plate-shaped member 10 of the pressure sensing device 1 is in a range of $ri < r < ro$, is the region in which the elastic strain is generated according to the force transmitted through the core body 31 as illustrated in FIG. 2A, where ri represents the radius of the head portion 34a of the coupling screw 34, and ro represents the inner diameter of the sensor holder 33 (same as the inner diameter of the ring-shaped washer member 32).

As illustrated in FIGS. 2A and 3A, the plurality of strain sensitive materials 11 are provided in the ring-shaped region RG with the width W in the surface portion 10a of the plate-shaped member 10 in the pressure sensing device 1 of the embodiment.

Incidentally, the plate-shaped member 10 of the pressure sensing device 1 in the example has a disk shape with the constant thickness d. The plate-shaped member 10 is fixed at the peripheral portion 10E of the plate-shaped member 10, and the force is applied to the center position Oc (see FIG. 2A) of the plate-shaped member 10 through the core body 31.

Here, the width direction of the ring-shaped region RG with the width W of the plate-shaped member 10 (radius direction of the plate-shaped member 10) is divided into three regions including an inner ring-shaped region RG1 in a range of radius ri to radius r1 from the center position Oc of the plate-shaped member 10, an intermediate ring-shaped region RG0 in a range of radius r1 to radius r2, and an outer ring-shaped region RG2 in a range of radius r2 to radius r0. The inner ring-shaped region RG1 is an example of a first ring-shaped region, and the outer ring-shaped region RG2 is an example of a second ring-shaped region.

When the radius direction of the plate-shaped member 10 is divided into regions in this way, large strain in opposite directions is generated in the inner ring-shaped region RG1 and the outer ring-shaped region RG2 of the ring-shaped region RG when force is applied to the pen tip member 204 of the core body 31. The intermediate ring-shaped region RG0 is a transition region in which the strain generated according to the applied force is changed in the opposite direction. Therefore, the generated strain is small, and the strain is hardly generated at the center part of the intermediate ring-shaped region RG0 in the radius direction.

More specifically, when the plate-shaped member 10 of the pressure sensing device 1 receives force in the direction orthogonal to the surface portion 10a (force in the Z-axis direction) through the force reception portion 31, the plate-shaped member 10 is elastically deformed to protrude downward as illustrated in FIG. 2B. In this case, equal strain is generated throughout the entire circumference of the plate-shaped member 10 at positions with the same radius from the center position Oc in the radial direction when the force other than the force in the Z-axis direction is zero. The strain corresponds to the magnitude of the applied force. The strain is elongation strain in the inner ring-shaped region RG1 and is shrinkage strain in the outer ring-shaped region RG2 as illustrated in FIG. 2B. Strain in opposite directions is generated. The strain is relatively small in the intermediate ring-shaped region RG0.

Therefore, the strain sensitive materials 11 can be provided at positions with large strain in the inner ring-shaped region RG1 and the outer ring-shaped region RG2, and the elongation strain in the inner ring-shaped region RG1 and the shrinkage strain in the outer ring-shaped region RG2 can be detected to detect the force in the Z-axis direction. That is, the resistance values of the strain sensitive materials 11 provided in the inner ring-shaped region RG1 and the resistance values of the strain sensitive materials provided in the outer ring-shaped region RG2 change in opposite directions (increase direction and decrease direction). Therefore, the force in the Z-axis direction applied to the pressure sensing device 1 can be detected based on the changes in resistance values.

When the plate-shaped member 10 receives force in a direction parallel to the surface portion 10a of the plate-shaped member 10 of the pressure sensing device 1 (force in the X-axis direction or the Y-axis direction) through the core body 31 as an example of a force reception portion, wavy strain deformation asymmetric with respect to the center position Oc of the plate-shaped member 10 occurs in the plate-shaped member 10 as illustrated in FIG. 2C. The degree of strain deformation corresponds to the magnitude of the applied forced, and as illustrated in FIG. 2C, the strain is generated in opposite directions around the center position Oc in the plate-shaped member 10.

More specifically, as illustrated in FIG. 2C, shrinkage strain is generated in the inner ring-shaped region RG1, and elongation strain is generated in the outer ring-shaped region RG2 on the front side of the center position as viewed in the direction of force applied to the core body 31 as an example of the force reception portion. On the back side of the center position Oc as viewed in the direction of force applied to the core body 31 as an example of the force reception portion, elongation strain is generated in the inner ring-shaped region RG1, and shrinkage strain is generated in the outer ring-shaped region RG2. The strain is relatively small in the intermediate ring-shaped region RG0.

Therefore, the force components in the X-axis direction or the Y-axis direction can be detected from the changes in the resistance values corresponding to the strain of the strain sensitive materials 11 arranged in the inner ring-shaped region RG1 and the changes in the resistance values corresponding to the strain of the strain sensitive materials 11 arranged in the outer ring-shaped region RG2. In this case, the strain is generated in opposite directions in the inner ring-shaped region RG1 and the outer ring-shaped region RG2 on the front side of the center position Oc and in the inner ring-shaped region RG1 and the outer ring-shaped region RG2 on the back side. Therefore, the difference in strain detection output detected by the strain sensitive materials 11 is acquired in each of the front side and the back side of the center position Oc, and the obtained detection output of the force components in the X-axis direction or the Y-axis direction is doubled.

In view of such a strain generation condition in the plate-shaped member 10 of the pressure sensing device 1 of the embodiment, the strain sensitive materials 11 are arranged on the plate-shaped member 10 of the pressure sensing device 1 as described below to provide a 3-axis pressure sensing device.

In the embodiment, the force applied in the direction orthogonal to the surface portion 10a of the plate-shaped member 10 of the pressure sensing device 1 is received as force in the Z-axis direction, and the magnitude of the force is detected. In the embodiment, the forces orthogonal to each other applied in the directions parallel to the surface direction of the surface portion 10a of the plate-shaped member 10 of the pressure sensing device 1 is received as force in the X-axis direction and the Y-axis direction, and the magnitude of the force is detected.

To provide the 3-axis pressure sensing device in the pressure sensing device 1 of the embodiment, the circumferential direction of the surface portion 10a of the plate-shaped member 10 including a circular plate is divided into four regions as indicated by dotted lines in FIGS. 2A and 3A to divide the circumferential direction of the surface portion 10a into regions including four fan-shaped regions SX1, SY1, SX2, and SY2 each with a 90-degree angle range. In this case, as illustrated in FIG. 2A, the fan-shaped regions SX1 and SX2 face each other in the X-axis direction with respect to the center position Oc, and the fan-shaped regions SY1 and SY2 face each other in the Y-axis direction with respect to the center position Oc in the example.

In the embodiment, the strain sensitive materials 11 are arranged in each of the fan-shaped regions SX1, SY1, SX2, and SY2 to detect the strain generated in opposite directions (elongation strain and shrinkage strain) in the inner ring-shaped region RG1 and the outer ring-shaped region RG2 according to the force applied to the plate-shaped member 10 through the core body 31 as an example of the force reception portion.

More specifically, the strain sensitive materials 11 are provided in each of the inner ring-shaped region RG1 and the outer ring-shaped region RG2 of the ring-shaped region RG in each of the fan-shaped regions SX1, SY1, SX2, and SY2 of the surface portion 10a of the plate-shaped member 10 in the embodiment.

To provide bridge circuits of a strain detection circuit, two strain sensitive materials 11 are provided in the circumferential direction in each of the inner ring-shaped region RG1 and the outer ring-shaped region RG2 in each of the fan-shaped regions SX1, SY1, SX2, and SY2 in the embodiment.

Figure 9A:
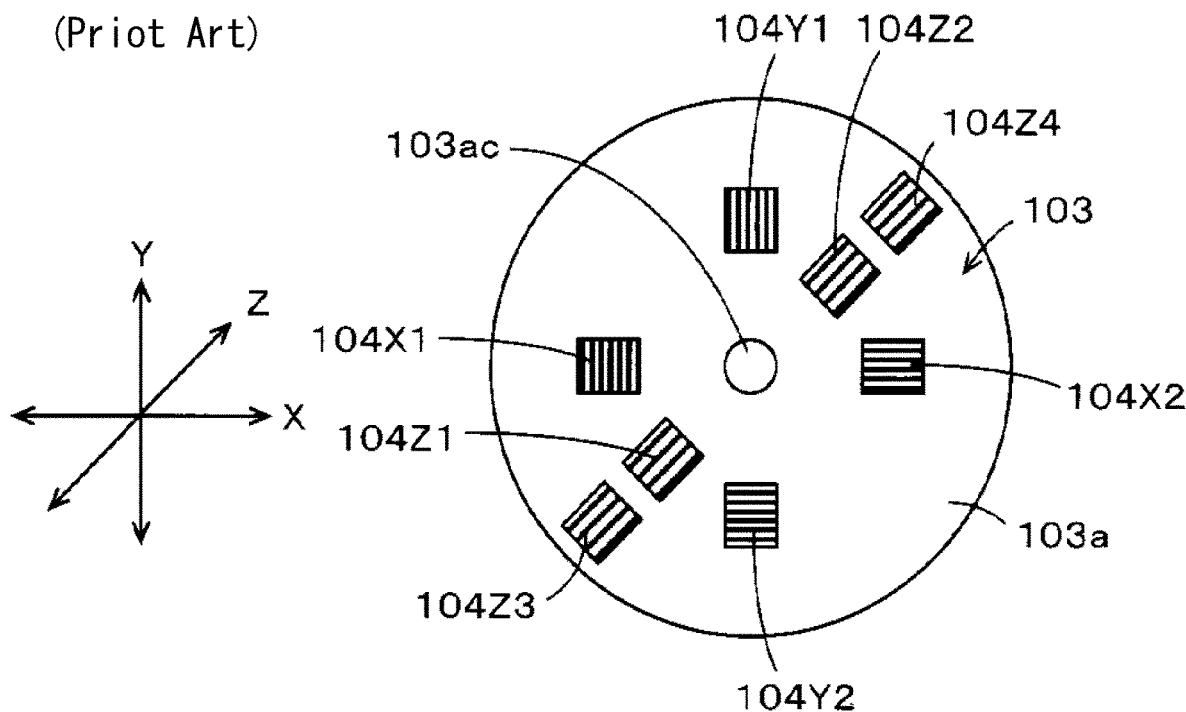
FIGS. 9A and 9B are diagrams for describing an example of the existing pressure sensing device.
Figure 9B:
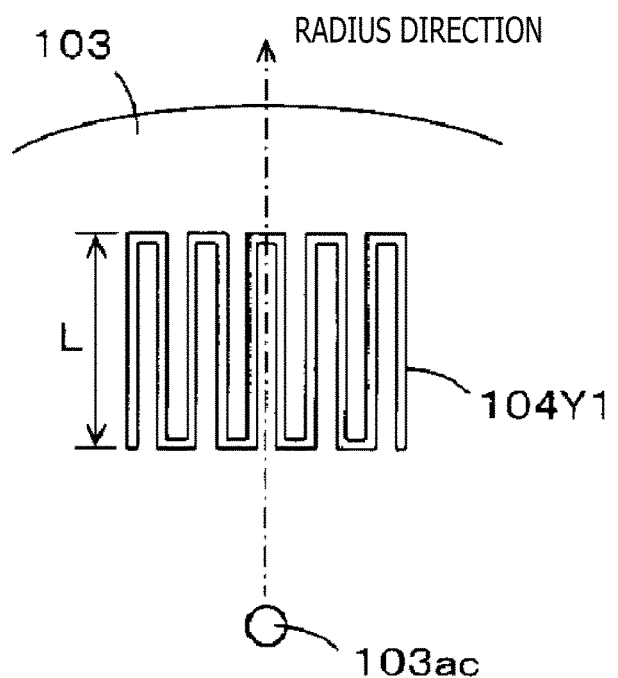

The strain sensitive material 11 used in the embodiment contains a conductive material in which the resistance value changes according to the strain deformation. A linear conductive member is folded for a plurality of times in a zig-zag pattern in the circumferential direction to form the strain sensitive material 11 similar to the one illustrated in FIG. 9B. The length of the plate-shaped member 10 in the radius direction (radial direction as viewed from the application point of force), which is the generation direction of strain, is L0 in the zig-zag pattern. The conductive member included in the strain sensitive material is, for example, a Cu—Ni alloy.

To distinguish the strain sensitive materials 11 provided in the fan-shaped regions SX1, SY1, SX2, and SY2 of the surface portion 10a of the plate-shaped member 10, parentheses are attached to reference signs 11, and different reference signs are provided in the parentheses in FIGS. 2A and 3A. In the following description, the reference signs will be used without change to refer to the strain sensitive materials 11 when they do not have to be distinguished one from another. The reference signs in parentheses will be used in the description when the strain sensitive materials 11 have to be distinguished.

In FIGS. 2A and 3A, the strain sensitive materials 11 in a zig-zag pattern are arranged in each of the fan-shaped regions SX1, SY1, SX2, and SY2. In the fan-shaped region SX1, two strain sensitive materials X1 and X2 containing a conductive material formed in a zig-zag pattern along the circumferential direction are provided in the inner ring-shaped region RG1. Two strain sensitive materials X3 and X4 containing a conductive material formed in a zig-zag pattern along the circumferential direction are provided in the outer ring-shaped region RG2. In the fan-shaped region SX2, two strain sensitive materials X5 and X6 containing a conductive material formed in a zig-zag pattern along the circumferential direction are provided in the inner ring-shaped region RG1. Two strain sensitive materials X7 and X8 containing a conductive material formed in a zig-zag pattern along the circumferential direction are provided in the outer ring-shaped region RG2.

In the fan-shaped region SY1, two strain sensitive materials Y1 and Y2 containing a conductive material formed in a zig-zag pattern along the circumferential direction are provided in the inner ring-shaped region RG1. Two strain sensitive materials Y3 and Y4 containing a conductive material formed in a zig-zag pattern along the circumferential direction are provided in the outer ring-shaped region RG2. In the fan-shaped region SY2, two strain sensitive materials Y5 and Y6 containing a conductive material formed in a zig-zag pattern along the circumferential direction are provided in the inner ring-shaped region RG1. Two strain sensitive materials Y7 and Y8 containing a conductive material formed in a zig-zag pattern along the circumferential direction are provided in the outer ring-shaped region RG2.

That is, in the embodiment, the strain sensitive material 11 is provided by folding the linear conductive member for a plurality of times in a zig-zag pattern in the direction (circumferential direction) orthogonal to the radius direction of the plate-shaped member 10, and the length in the radius direction of the plate-shaped member 10 (strain generation direction) is set to the length L0 in the zig-zag pattern as illustrated in FIGS. 2A and 3A. The length in the circumferential direction is a length within the angle range of each of the arranged fan-shaped regions SX1, SY1, SX2, and SY2.

In the embodiment, each of the plurality of strain sensitive materials 11 has an arc shape and is arranged on the surface portion 10a of the plate-shaped member 10 along the circumferential direction. In this case, the strain sensitive materials 11 in the embodiment are arranged by bringing the parts at the length L0 into line with sections with large strain in each of the inner ring-shaped region RG1 and the outer ring-shaped region RG2 according to the force applied to the plate-shaped member 10.

As the strain sensitive materials 11 are arranged in this way, the pressure sensing device 1 can hold and detect the strain with sufficient sensitivity and with large detection output voltage. More specifically, the strain of the strain sensitive materials 11 including linear conductive materials formed in the circumferential direction in a zig-zag pattern and including the zig-zag pattern with the length L0 in the direction of the radius of the plate-shaped member 10 is detected at the parts of the length L in the strain sensitive materials 11. The strain at the parts of the length L is detected throughout the length of the strain sensitive materials 11 in the circumferential direction.

In the embodiment, the strain sensitive materials X1, X2, X5, and X6 and the strain sensitive materials Y1, Y2, Y5, and Y6 arranged in the inner ring-shaped region RG1 are arranged at positions with large strain generated according to the force applied in the inner ring-shaped region RG1, that is, center positions of the inner ring-shaped region RG1 in the width direction (radius direction) or near the center positions in the example, in the surface portion 10a of the plate-shaped member 10. That is, the center positions of the parts at the length L0 of the conductive materials in a zig-zag pattern included in the strain sensitive materials X1, X2, X5, and X6 and the strain sensitive materials Y1, Y2, Y5, and Y6 are pinpointed and arranged at the center positions in the width direction (radius direction) with large strain or near the center positions in the inner ring-shaped region RG1.

As described above, the strain sensitive materials X1, X2, X5, and X6 and the strain sensitive materials Y1 Y2, Y5, and Y6 are arranged corresponding to the strain generation positions along the circumferential direction at the same radius positions from the center position Oc in the surface portion 10a of the plate-shaped member 10.

Similarly, the strain sensitive materials X3, X4, X7, and X8 and the strain sensitive materials Y3, Y4, Y7, and Y8 arranged in the outer ring-shaped region RG2 are arranged at positions with large strain generated according to the force applied in the outer ring-shaped region RG2, that is, center positions of the outer ring-shaped region RG2 in the width direction (radius direction) or near the center positions in the example. Therefore, the strain sensitive materials X3, X4, X7, and X8 and the strain sensitive materials Y3, Y4, Y7, and Y8 are arranged corresponding to the strain generation positions along the circumferential direction at the same radius positions from the center position Oc in the outer ring-shaped region RG2 of the surface portion 10a of the plate-shaped member 10.

The strain sensitive materials X1, X2, X5, and X6 and the strain sensitive materials Y1, Y2, Y5, and Y6 arranged in the inner ring-shaped region RG1 and the strain sensitive materials X3, X4, X7, and X8 and the strain sensitive materials Y3, Y4, Y7, and Y8 arranged in the outer ring-shaped region RG2 are aligned in the radial direction around the center position Oc of the plate-shaped member 10, that is, the strain generation direction, as illustrated in FIGS. 2A and 3A.

In the embodiment, the resistance values when there is no strain are equal at least in each set of two strain sensitive materials 11 lined up in the radial direction (radius direction)

from the center position Oc among the strain sensitive materials X1, X2, X5, and X6 and the strain sensitive materials Y1, Y2, Y5, and Y6 arranged in the inner ring-shaped region RG1 and the strain sensitive materials X3, X4, X7, and X8 and the strain sensitive materials Y3, Y4, Y7, and Y8 arranged in the outer ring-shaped region RG2.

In the embodiment, all of the resistance values when there is no strain are the same in the strain sensitive materials X1, X2, X5, and X6 and the strain sensitive materials Y1, Y2, Y5, and Y6 arranged in the circumferential direction in the inner ring-shaped region RG1 so that the sensitivity of strain will be equal in the entire radial direction around the center position Oc of the plate-shaped member 10. Therefore, all of the strain sensitive materials X1 to X8 and the strain sensitive materials Y1 to Y8 are formed in the example such that the resistance values when there is no strain are equal.

In this case, the resistance values of the strain sensitive materials 11 are determined by the width, the length, and the thickness of the conductive material and the ingredients of the conductive material. Therefore, the conductive material with equal width, length, and thickness is used to make the resistance values equal when there is no strain. However, the width, the length, and the thickness of the conductive material of the strain sensitive materials X1 to X8 and the strain sensitive materials Y1 to Y8 may be adjusted to make the resistance values equal when there is no strain.

Each of the strain sensitive materials 11 is formed in advance on the surface portion 10a of the plate-shaped member 10, and the conductive pattern 12 is formed to form predetermined circuits, which are bridge circuits in the example, in the pressure sensing device 1 of the embodiment. Connection electrodes for the formed bridge circuits and the circuit parts formed on the external printed circuit board 26 are formed on the surface portion 10a of the plate-shaped member 10. In the embodiment, each of the connection electrodes is formed and positioned in the intermediate ring-shaped region RG0, in which the generated strain is small even when force is applied, in the plate-shaped member 10 as described later with reference to FIG. 3A.

The core body 31 is screwed and coupled as a force reception portion at the center part of the plate-shaped member 10, and the pressure sensing device 1 of the embodiment is fixed in the hollow portion 201a of the housing 201 of the stylus 2 at the peripheral portion 10E of the plate-shaped member 10 such that the pressure sensing device 1 cannot move in the axial direction. In this way, the pressure sensing device 1 can be attached to the housing 201 of the stylus 2, and therefore, the pressure sensing device 1 can easily be attached to the stylus 2.

In the pressure sensing device 1 of the embodiment, four strain sensitive materials arranged in each of the fan-shaped regions SX1, SY1, SX2, and SY2 of the surface portion 10a of the plate-shaped member 10 provide a bridge circuit included in the strain detection circuit as described above. The conductive pattern 12 is arranged as illustrated in FIG. 3A to form the bridge circuit in each of the fan-shaped regions SX1, SY1, SX2, and SY2. Note that, in FIG. 3A, the conductive pattern 12 is illustrated as an outlined track pattern to distinguish the conductive pattern 12 from the strain sensitive materials 11 indicated by hatching.

The bridge circuits each including four strain sensitive materials 11 arranged in each of the fan-shaped regions SX1, SY1, SX2, and SY2 have similar configurations. FIG. 4 depicts a representative example of the configuration of the bridge circuit formed by electrically connecting four strain sensitive materials X1 to X4 through the conductive pattern 12 in the fan-shaped region SX1. As illustrated in FIG. 4, each of the bridge circuits includes four connection electrodes tV, tG, tO(+), and tO(−) for electrical connection with the conductive pattern of the printed circuit board 26 in the hollow portion 201a of the housing 201 of the stylus 2. The connection electrode tV is an electrode supplied with a power supply voltage Vcc. The connection electrode tG is a grounded electrode. The connection electrode tO(+) is a first output terminal of the bridge circuit. The connection electrode tO(−) is a second output electrode of the bridge circuit.

As illustrated in FIG. 4, a series circuit of the strain sensitive material X1 and the strain sensitive material X3 and a series circuit of the strain sensitive material X2 and the strain sensitive material X4 are connected in parallel between the electrode tV supplied with the power supply voltage Vcc and the grounded electrode tG in the bridge circuit of the fan-shaped region SX1. The first output electrode tO(−) is led from the connection point of the strain sensitive material X1 and the strain sensitive material X3, and the second output electrode tO(+) is led from the connection point of the strain sensitive material X2 and the strain sensitive material X4.

The four connection electrodes tV, tG, tO(+), and tO(−) of the bridge circuit are formed as part of the conductive pattern 12 in the intermediate ring-shaped region RG0, which is a region with small strain, on the surface portion 10a of the plate-shaped member 10 as illustrated in FIG. 3A. Therefore, even when the force is applied to the pressure sensing device 1 through the core body 31 and the strain deformation is generated in the plate-shaped member 10 of the pressure sensing device 1, small strain is generated in the intermediate ring-shaped region RG0 provided with the connection electrodes tV, tG, tO(+), and tO(−). An electrical failure is unlikely to occur at the electrical connection parts of the connection electrodes tV, tG, tO(+), tO(−) and external circuits.

Assuming that all of the resistance values of the strain sensitive materials X1 to X4 are equal in the circuit of FIG. 4, the output voltages of the output electrode tO(−) and the output electrode tO(+) are equal when there is no strain, and the output voltage as a difference between the output voltages is zero.

When force is applied to the pressure sensing device 1, the strain received in the inner ring-shaped region RG1 including the strain sensitive material X1 and the strain received in the outer ring-shaped region RG2 including the strain sensitive material X3 are in opposite directions according to the applied force, and therefore, the resistance values of the strain sensitive material X1 and the strain sensitive material X3 change in opposite directions. A voltage corresponding to the difference between the resistance value of the strain sensitive material X1 and the resistance value of the strain sensitive material X3 is obtained in the output electrode O(−), and a voltage in the opposite direction of the output electrode tO(−) corresponding to the difference between the resistance value of the strain sensitive material X2 and the resistance value of the strain sensitive material X4 is obtained in the output electrode tO(+). Therefore, obtained is a voltage EX1 that is a voltage of a difference between the voltage obtained in the output electrode tO(−) and the output voltage obtained in the output electrode tO(+) and that corresponds to the force components in the X-axis direction of the force applied to the pressure sensing device 1.

As also described above, the bridge circuit is similarly formed in each of the other fan-shaped regions SX2, SY1, and SY2, and the output voltage corresponding to the force applied to the pressure sensing device 1 is obtained. More specifically, in the case of the fan-shaped region SX2, the strain sensitive material X5 is connected in place of the strain sensitive material X1 of the fan-shaped region SX1, the strain sensitive material X6 is connected in place of the strain sensitive material X2, the strain sensitive material X7 is connected in place of the strain sensitive material X3, and the strain sensitive material X8 is connected in place of the strain sensitive material X4 as indicated in parentheses in FIG. 4. In this way, obtained is a voltage EX2 that is a voltage of a difference between the voltage obtained in the output electrode tO(−) and the output voltage obtained in the output electrode tO(+) and that corresponds to the force components in the X-axis direction applied to the pressure sensing device 1.

In the case of the fan-shaped region SY1, the strain sensitive material Y1 is connected in place of the strain sensitive material X1 in FIG. 4, the strain sensitive material Y2 is connected in place of the strain sensitive material X2, the strain sensitive material Y3 is connected in place of the strain sensitive material X3, and the strain sensitive material Y4 is connected in place of the strain sensitive material X4. In this way, obtained is a voltage EY1 that is a voltage of a difference between the voltage obtained in the output electrode tO(−) and the output voltage obtained in the output electrode tO(+) and that corresponds to the force components in the Y-axis direction of the force applied to the pressure sensing device 1.

In the case of the fan-shaped region SY2, the strain sensitive material Y5 is connected in place of the strain sensitive material X1 in FIG. 4, the strain sensitive material Y6 is connected in place of the strain sensitive material X2, the strain sensitive material Y7 is connected in place of the strain sensitive material X3, and the strain sensitive material Y8 is connected in place of the strain sensitive material X4. In this way, obtained is a voltage EY2 that is a voltage of a difference between the voltage obtained in the output electrode tO(−) and the output voltage obtained in the output electrode tO(+) and that corresponds to the force components in the Y-axis direction of the force applied to the pressure sensing device 1.

In this way, the output voltages EX1, EX2, EY1, and EY2 of four bridge circuits formed in the fan-shaped regions SX1, SX2, SY1, and SY2 are used to obtain an output voltage EZ of the force components in the Z-axis direction of the force applied to the core body 31 as an example of the force reception portion of the pressure detection member 2, an output voltage EX of the force components in the X-axis direction, and an output voltage EY of the force components in the Y-axis direction based on the following arithmetic expressions.

As for the force components in the Z-axis direction, similar strain deformation is generated in the radial direction around the center position Oc of the plate-shaped member 10 as illustrated in FIG. 2B. Therefore, the detection output voltage EZ of the pressure detection member 2 is calculated as follows.

$$EZ=EX1+EX2+EY1+EY2$$

As for the force components in the X-axis direction, strain in opposite directions is generated on the front side and the back side of the center position Oc of the plate-shaped member 10 as illustrated in FIG. 2C. Therefore, the detection output voltage EX of the pressure detection member 2 is calculated as follows.

$$EX=EX1-EX2$$

As for the force components in the Y-axis direction, strain in opposite directions is similarly generated on the front side and the back side of the center position Oc of the plate-shaped member 10 as illustrated in FIG. 2C. Therefore, the detection output voltage EY of the pressure detection member 2 is calculated as follows.

$$EY=EY1-EY2$$

As described above, the strain sensitive materials 11 and the conductive pattern 12 are formed on the surface portion 10a of the plate-shaped member 10 of the pressure sensing device 1 in the embodiment, and the connection electrodes tV, tG, tO(+), and tO(−) are also formed.

FIGS. 5A to 5D are diagrams for describing layered configurations of the strain sensitive materials 11, the conductive pattern 12, and the connection electrodes tV, tG, tO(+), and tO(−) on the surface portion 10a of the plate-shaped member 10 of the pressure sensing device 1.

Figure 5A:
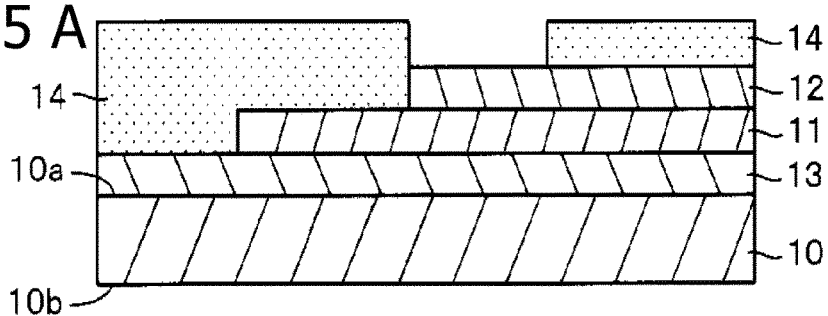
FIGS. 5A to 5D are diagrams for describing a configuration example of the embodiment of the pressure sensing device according to the present disclosure.

FIG. 5A is a diagram for describing a case of using a normal general method to form the connection electrodes tV, tG, tO(+), and tO(−). An insulating film 13 is first formed on substantially the entire surface of the surface portion 10a of the plate-shaped member 10. The strain sensitive material 11 is then deposited at the predetermined position on the insulating film 13. A layer of the conductive pattern 12 partially overlaps with the strain sensitive material 11, and the layer of the conductive pattern 12 and the strain sensitive material 11 are electrically connected and laminated. The strain sensitive material 11 and the layer of the conductive pattern 12 are covered by a photoresist layer 14 that is an insulating material, except for the parts of the connection electrodes tV, tG, tO(+), and tO(−). In this way, the bridge circuit is formed on the surface portion 10a of the plate-shaped member 10.

In the configuration of FIG. 5A, the part where the photoresist layer 14 is removed and the layer of the conductive pattern 12 is exposed on the outside includes the connection electrodes tV, tG, tO(+), and tO(−). Therefore, the part of the connection electrodes tV, tG, tO(+), and tO(−) is formed as a recessed portion of the photoresist layer 14 in the configuration of FIG. 5A.

As described above, the circuit formed on the printed circuit board 26 of the stylus 2 and the pressure sensing device 1 are connected through the flexible board 36 in the embodiment. As illustrated in FIG. 1B, an end portion of the flexible board 36 is crimped to the surface portion 10a of the plate-shaped member 10 of the pressure sensing device 1 to electrically connect the connection electrodes tV, tG, tO(+), and tO(−) on the surface portion 10a of the pressure sensing device 1 to the conductive pattern of the flexible board 36. In this example, anisotropic conductive film (ACF) crimping is particularly used to electrically connect the connection electrodes tV, tG, tO(+), and tO(−) on the surface portion 10a of the pressure sensing device 1 to the conductive pattern of the flexible board 36.

In this case, the electrical connection to the conductive pattern of the flexible board 36 may be incomplete when the part of the connection electrodes tV, tG, tO(+), and tO(−) is formed as a recessed portion of the photoresist layer 14 as in the configuration of FIG. 5A.

Figure 5B:
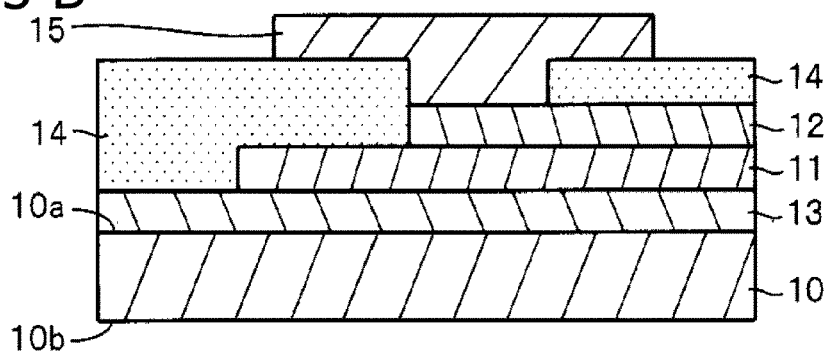

Therefore, a layer of a conductive pattern 15 (layer of conductive member) electrically connected to the layer of the conductive pattern 12 (layer of conductive member) of the recessed portion of the photoresist layer 14 is further formed in the embodiment as illustrated in FIG. 5B.

Figure 5C:
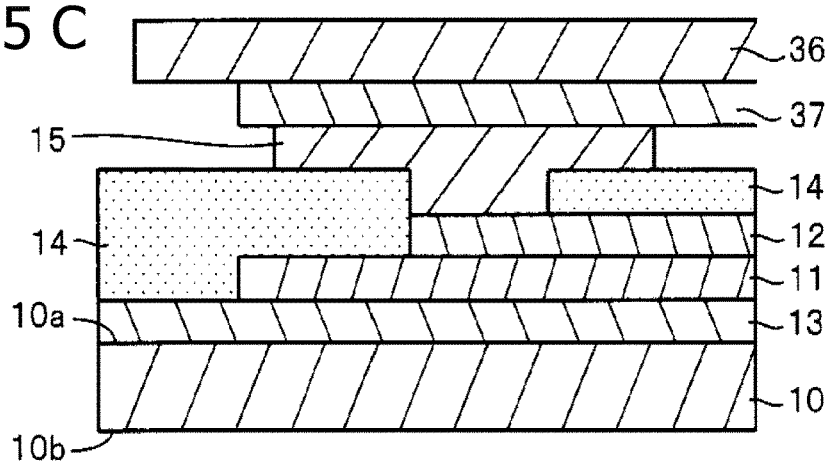

In this way, the connection electrode can be formed by providing two layers of conductive patterns including the layer of the conductive pattern 12 and the layer of the conductive pattern 15. As a result, when the flexible board 36 including a conductive pattern 37 is crimped to the surface portion 10*a* of the plate-shaped member 10 as illustrated in FIG. 5C, the conductive pattern 15 and the conductive pattern 37 are surely brought into contact with each other, and the problem of electrical connection is improved.

Figure 6:
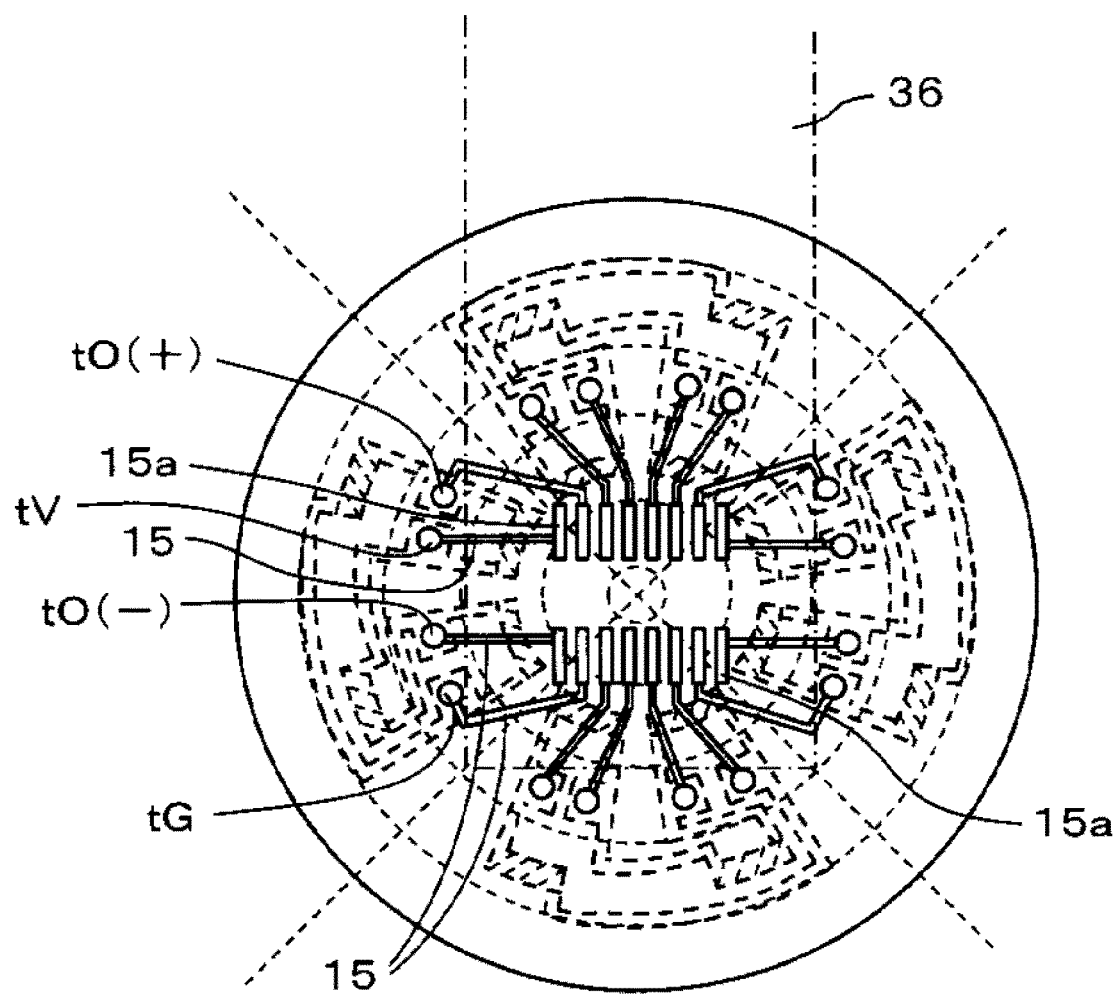
FIG. 6 is a diagram for describing a configuration of connection of the pressure sensing device of the embodiment and an internal circuit of the stylus in the embodiment of the stylus according to the present disclosure.

FIG. 6 illustrates an example of the conductive pattern 15 formed on the photoresist layer 14 on the surface portion 10*a* of the plate-shaped member 10 of the pressure sensing device 1. In FIG. 6, the strain sensitive materials 11 (X1, X2, X3, X4 and X5, X6, X7, X8 or Y1, Y2, Y3, Y4 and Y5, Y6, Y7, Y8) arranged in the inner ring-shaped region RG1 and the outer ring-shaped region RG2 illustrated in FIGS. 2A and 3A are hatched with broken lines. More specifically, in the example of FIG. 6, the terminal conductive pattern 15 is extended from each of the connection electrodes tV, tG, tO(+), and tO(−) formed in the intermediate ring-shaped region RG0 in the four bridge circuits on the surface portion 10*a* of the plate-shaped member 10, and terminals 15*a* for ACF crimping are formed. The terminal conductive pattern is similarly extended from each of the connection electrodes tV, tG, tO(+), and tO(−) of the four bridge circuits, and sixteen terminals 15*a* for ACF crimping are formed near the center part of the surface portion 10*a* of the plate-shaped member 10 as illustrated in FIG. 6.

Therefore, the ACF crimping is executed by placing the flexible board 36 on the surface portion 10*a* of the plate-shaped member 10 so as to provide ACF crimp connection by using the sixteen terminals 15*a* for ACF crimping in FIG. 6. In this way, the pressure sensing device 1 and the circuits of the printed circuit board 26 are connected.

Note that jumper connection is necessary when there is another strain sensitive material between two strain sensitive materials 11 in electrically connecting the two strain sensitive materials 11. The two layers in the example including the layer of the conductive pattern 12 and the layer of the conductive pattern 15 can be used to easily form the jumper connection.

Figure 5D:
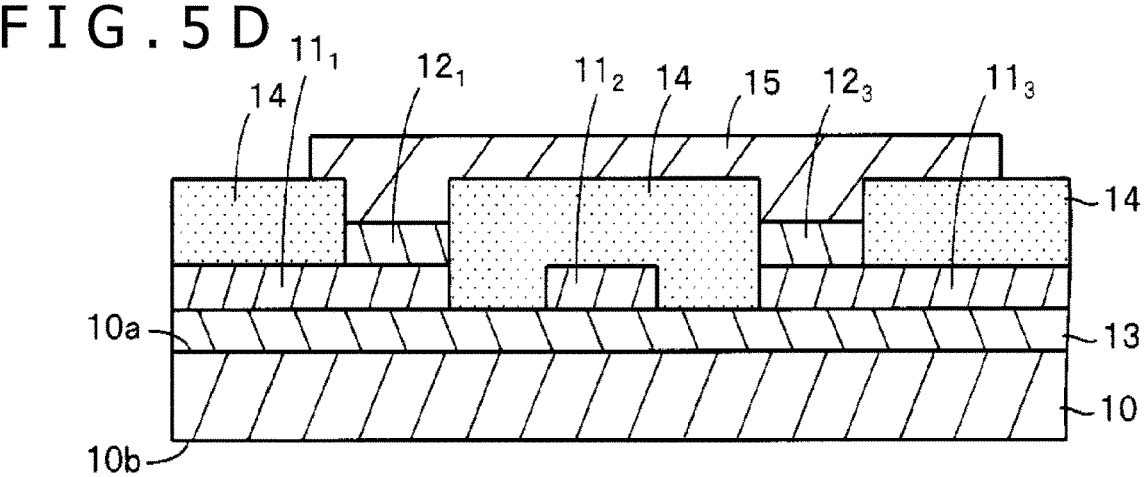

For example, when three strain sensitive materials 11$_1$, 11$_2$, and 11$_3$ are formed on the insulating film 13 as illustrated in FIG. 5D, the following configuration is used to jump over the strain sensitive material 11$_2$ to electrically connect the strain sensitive material 11$_1$ and the strain sensitive material 11$_3$ formed at positions across the strain sensitive material 11$_2$. More specifically, an electrode including a layer of a conductive pattern 12$_1$ is formed for the strain sensitive material 11$_1$, and an electrode including a layer of a conductive pattern 12$_3$ is formed for the strain sensitive material 11$_3$. The photoresist layer 14 that is an insulating layer is formed on the strain sensitive material 11$_2$ between the electrode including the layer of the conductive pattern 12$_1$ and the electrode including the layer of the conductive pattern 12$_3$. The layer of the conductive pattern 15 is formed to provide electrical jumper connection between the electrode including the layer of the conductive pattern 12$_1$ electrically connected to the strain sensitive material 11$_1$ and the electrode including the layer of the conductive pattern 12$_3$ electrically connected to the strain sensitive material 11$_3$. In this way, the conductive patterns of two layers can be used to electrically connect the strain sensitive material 11$_1$ and the strain sensitive material 11$_3$ beyond the strain sensitive material 11$_2$.

Although the ACF crimping is provided between the pressure sensing device 1 and the flexible board 36 in the embodiment, it is obvious that the method of crimping and connecting the pressure sensing device 1 and the flexible board 36 is not limited to the ACF crimping.

[Electronic Circuit Configuration of Stylus 2 and Position Detection Apparatus]

A configuration example of an electronic circuit of the stylus 2 configured as described above and a configuration example of an electronic circuit of a position detection apparatus 3 inductively coupled to the stylus 2 will be described with reference to FIG. 7.

Figure 7:
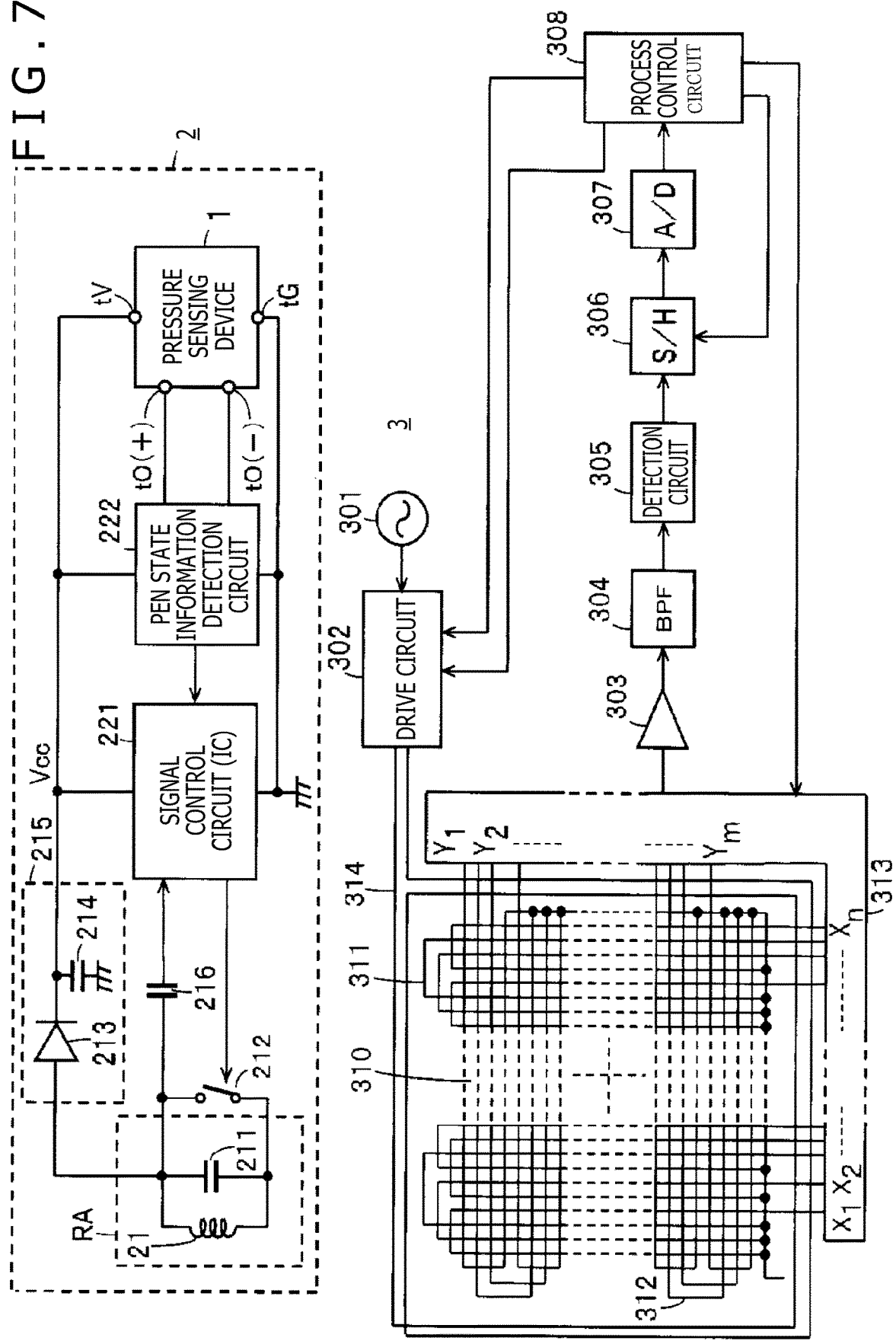
FIG. 7 depicts a configuration example of an electronic circuit of the embodiment of the stylus according to the present disclosure and a configuration example of an electronic circuit of a position detection apparatus.
Figure 8A:
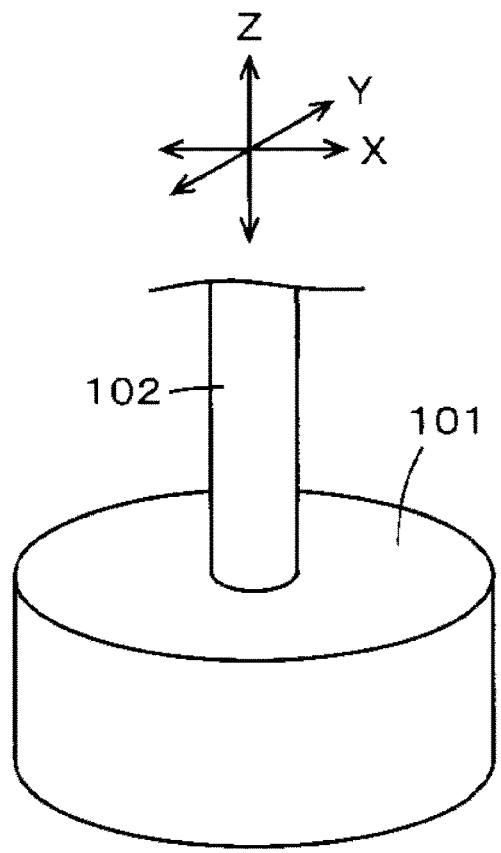
FIGS. 8A and 8B are diagrams for describing an example of a pressure detection member including an existing pressure sensing device.
Figure 8B:
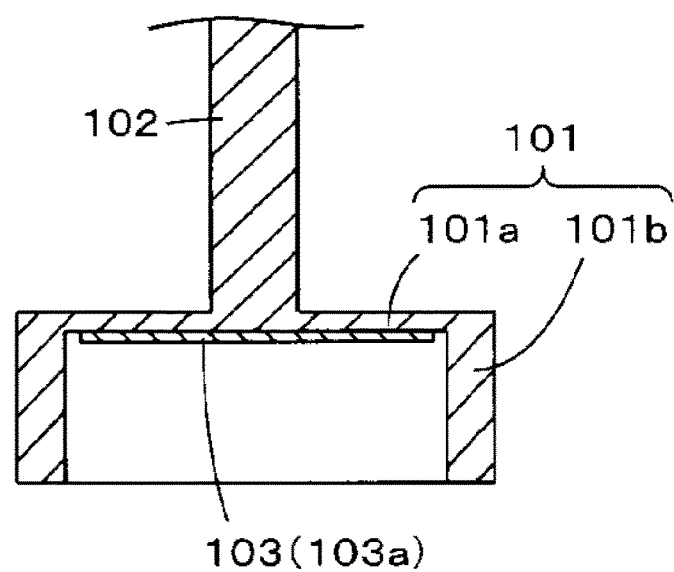

As illustrated in FIG. 7, the stylus 2 of the example includes a resonant circuit RA including the coil 21 wound around the ferrite core 22 and a capacitor 211 arranged on the printed circuit board 26.

On the other hand, the position detection apparatus 3 includes a position detection sensor 310 with a layered configuration of an X-axis direction loop coil group 311 and a Y-axis direction loop coil group 312. The position detection apparatus 3 is inductively coupled to the resonant circuit RA including the coil 21 and the capacitor 211 to detect the instruction position of the stylus 2 by detecting the position on the position detection sensor 310 that receives a signal from the stylus 2.

The stylus 2 of the example has a function of detecting pen state information, such as the pen pressure applied to the pen tip member 204 based on the detection output of the pressure sensing device 1, the tilt of the stylus 2, and the fiction force, and transmitting the pen state information to the position detection information to the position detection apparatus 3. In the example, the pen state information of the stylus 2 is transmitted as a digital signal from the stylus 2 to the position detection apparatus 3. Therefore, the stylus 2 includes a signal control circuit 221 and a pen state information detection circuit 222 including integrated circuit (IC) circuits as illustrated in FIG. 7.

The output electrodes tO(+) and the output electrodes tO(−) among the connection electrodes of the four bridge circuits of the pressure sensing device 1 are connected to the pen state information detection circuit 222. Although FIG. 7 illustrates one set of output electrode tO(+) and output electrode tO(−) connected in the pressure sensing device 1 and the pen state information detection circuit 222, for convenience, in practice, the output electrode tO(+) and the output electrode tO(−) of each of the four bridge circuits are connected.

The pen state information detection circuit 222 detects the pen state information, such as the pen pressure applied to the pen tip member 204 of the stylus 2 and the tilt of the stylus 2, as described above, based on the output from the four bridge circuits of the pressure sensing device 1. The pen state information detection circuit 222 supplies the detected pen state information to the signal control circuit 221.

In the stylus 2 of the embodiment, a switch circuit 212 is connected in parallel to the resonant circuit RA. The signal control circuit 221 controls on/off of the switch circuit 212. The signal control circuit 221 converts the pen state information received from the pen state information detection circuit 222 into a digital signal and controls on/off of the switch circuit 212 based on the digital signal. Amplitude shift keying (ASK) modulation is applied to the signal from the resonant circuit RA through the on/off control of the switch circuit 212, and the signal is supplied to the position detection sensor 310 of the position detection apparatus 3.

Energy transmitted from the position detection apparatus 3 through electromagnetic induction coupling is used as a power supply voltage for the signal control circuit 221 and the pen state information detection circuit 222 of the stylus 2 and for the pressure sensing device 1. More specifically, an excitation coil 314 for supplying power to the stylus 2 of the example is provided around the two loop coil groups 311 and 312 of the position detection sensor 310 in the position detection apparatus 3 of the example of FIG. 7. Note that it is obvious that a battery may be mounted on the stylus 2, and the power supply voltage may be supplied from the battery to the signal control circuit 221 and the pen state information detection circuit 222 of the stylus 2 and to the pressure sensing device 1.

In the stylus 2, a rectifier circuit (power supply circuit) 215 including a diode 213 and a capacitor 214 obtains the power supply voltage Vcc by rectifying an alternating current (AC) signal received by the resonant circuit RA including the coil 21 and the capacitor 211 through electromagnetic induction from the excitation coil 314 of the position detection sensor 310. The power supply voltage Vcc obtained by the rectifier circuit 215 is supplied to the signal control circuit 221, the pen state information detection circuit 222, and the electrode tV of each of the four bridge circuits of the pressure sensing device 1.

Although the power supply voltage Vcc is connected to one electrode tV of the pressure sensing device 1, for convenience, in FIG. 7, in practice, the power supply voltage Vcc is connected to the electrode tV of each of the four bridge circuits. This similarly applies to the grounded electrodes tG of the four bridge circuits.

The signal control circuit 221 is connected to the resonant circuit RA through a capacitor 216, and the signal control circuit 221 monitors the operation condition of the resonant circuit RA. By monitoring the operation condition of the resonant circuit RA, the signal control circuit 221 can perform desirable operation control by detecting a signal of the electromagnetic coupling condition with respect to the excitation coil 314 of the position detection apparatus 3, or although not described in the example, by detecting a signal of control data or the like transmitted from the position detection apparatus 3 through the two loop coil groups 311 and 312.

The excitation coil 314 in the position detection apparatus 3 of the example of FIG. 7 is connected to a drive circuit 302. The drive circuit 302 is connected to an oscillation circuit 301 that oscillates at a predetermined frequency fo.

The drive circuit 302 is controlled by a process control circuit 308 including a microcomputer. The process control circuit 308 controls the drive circuit 302 to control supply of an oscillation signal with the frequency fo from the oscillation circuit 301 to the excitation coil 314 to control signal transmission from the excitation coil 314 to the stylus 2.

The position detection apparatus 3 is provided with a selection circuit 313 that sequentially selects one loop coil in the two loop coil groups 311 and 312 of the position detection sensor 310. The process control circuit 308 controls the selection, and the selection circuit 313 selects one loop coil. A reception amplifier 303 amplifies the induced voltage generated in the loop coil selected by the selection circuit 313. The induced voltage is supplied to a band-pass filter 304, and only the components of the frequency fo are extracted. The band-pass filter 304 supplies the extracted components to a detection circuit 305.

The detection circuit 305 detects the components of the frequency fo. The detection circuit 305 supplies a direct current (DC) signal corresponding to the detected components of the frequency fo to a sample hold circuit 306 and further transmits the DC signal to an analog/digital (A/D) conversion circuit 307. The A/D conversion circuit 307 converts analog output of the sample hold circuit 306 into a digital signal and outputs the signal to the process control circuit 308.

The process control circuit 308 determines whether or not the value of the digital signal from the A/D conversion circuit 307 exceeds a predetermined threshold value and determines whether or not the loop coil selected by the selection circuit 313 is a loop coil at the position instructed by the stylus 2.

In addition to the detection of the instruction position of the stylus 2, the process control circuit 308 also detects a digital signal indicating intermittence of the signal from the stylus 2 to detect the pen state, such as the pen pressure and the tilt of the stylus 2.

Although the information of the pen state, such as the pen pressure and the tilt, is transmitted from the stylus 2 to the position detection apparatus 3 through electromagnetic coupling to the position detection sensor 310 in the description, near field communication means of, for example, a Bluetooth (registered trademark) standard may be additionally provided on the stylus 2 and the position detection apparatus 3, and wireless communication of the near field communication means may be used to transmit the information from the stylus 2 to the position detection apparatus 3.

Advantageous Effects of Embodiment

As described above, according to the pressure sensing device 1 of the embodiment, the connection electrodes tV, tG, tO(+), and tO(−) of the bridge circuits formed on the surface portion 10a of the plate-shaped member 10 are provided in a region, such as the intermediate ring-shaped region RG0, in which the strain corresponding to the applied force is small. Therefore, there is an advantageous effect that excellent electrical connection of the connection electrodes tV, tG, tO(+), and tO(−) and the conductors connected to the connection electrodes tV, tG, tO(+), and tO(−) can be maintained.

According to the pressure sensing device 1 of the embodiment, the strain sensitive materials 11 can be arranged in each of the inner ring-shaped region RG1 and the outer ring-shaped region RG2 that are regions at different positions in the radial direction (radius direction) from the center position of the disk-shaped plate-shaped member 10 to detect the force applied to the pressure sensing device 1.

In each of the fan-shaped regions obtained by dividing the disk-shaped plate-shaped member 10 in the circumferential direction, the pressure sensing device 1 of the embodiment can include the bridge circuit that detects the strain generated in the fan-shaped region according to the applied force as described above. The pressure sensing device 1 can use the output of the plurality of bridge circuits to detect the components of the applied force in the X-axis direction, the components in the Y-axis direction, and the components in the Z-axis direction with high sensitivity.

<Modifications>

In the stylus 2 of the embodiment, a screw is provided at the center part of the plate-shaped member 10 of the pressure sensing device 1 of the embodiment to couple the pressure sensing device 1 to the core body 31 included in the force reception portion. However, the coupling method of the pressure sensing device 1 and the core body 31 included in the force reception portion is not limited to screwing.

For example, the plate-shaped member 10 of the pressure sensing device 1 and the core body 31 may be integrally formed by, for example, SUS. The plate-shaped member 10 of the pressure sensing device 1 and the core body 31 may be welded or may be joined by an adhesive.

In this way, when the screw is not used, the plate-shaped member 10 of the pressure sensing device 1 does not have to include the through hole 10c for the coupling screw 34, and the space for the screw head of the coupling screw 34 on the surface portion 10a side of the plate-shaped member 10 of the pressure sensing device 1 does not have to be taken into account.

Electronic parts of passive parts, such as ICs and amplifiers, can be arranged at the center part on the surface portion 10a side of the plate-shaped member 10 of the pressure sensing device 1. In that case, the connection electrodes tV, tG, tO(+), and tO(−) of the bridge circuits or the terminals 15a for external connection of the conductive pattern 15 connected to connection electrodes tVB, tGB, tO(+), and tO(−) can be used as connection pads of the terminals of the electronic parts.

The ICs included in the pen state information detection circuit 222 may be electrically connected by soldering or the like to the terminals 15a for external connection of the conductive pattern 15 on the surface portion 10a of the pressure sensing device 1, and flexible boards or lead wires may be used to connect the ICs to other electronic circuits.

In the embodiment, the strain detection output is obtained according to the force components in three axis directions including the force components in the Z-axis direction, the force components in the X-axis direction, and the force components in the Y-axis direction of the force applied to the pressure sensing device. Therefore, the surface portion 10a of the plate-shaped member 10 is divided into four fan-shaped regions SX1, SX2, SY1, and SY2, and the strain sensitive materials 11 formed in a zig-zag pattern are provided in each region. However, the configuration is not limited to this.

For example, to obtain strain detection output corresponding to the force components in two axis directions including the force components in the Z-axis direction and one of the force components in the X-axis direction and the force components in the Y-axis direction of the force applied to the pressure sensing device 1, the surface portion 10a of the plate-shaped member 10 can be divided into two regions in the X-axis direction or divided into two regions in the Y-axis direction to form two semicircular regions. In each of the two semicircular regions, two strain sensitive materials 11 formed in a zig-zag pattern can be arranged in the inner ring-shaped region RG1, and two strain sensitive materials 11 formed in a zig-zag pattern can be arranged in the outer ring-shaped region RG2.

However, to obtain strain detection output corresponding to the force components in two axis directions including the force components in the X-axis direction and the force components in the Y-axis direction of the force applied to the pressure sensing device 1, the configuration of the pressure sensing device 1 needs to be similar to the configuration described above.

To detect only the force components in the Z-axis direction of the force applied to the pressure sensing device 1, two strain sensitive materials 11 formed in a zig-zag pattern can be arranged in the inner ring-shaped region RG1, and two strain sensitive materials 11 formed in a zig-zag pattern can be arranged in the outer ring-shaped region RG2 in each of the two semicircular regions as in the case of the detection in two axis directions when the bridge circuits are provided on the surface portion 10a of the plate-shaped member 10.

Note that, on the surface portion 10a of the plate-shaped member 10, the bridge circuit may be formed in each area obtained by dividing the circumferential direction into N areas (N is an integer equal to or greater than two) around the center position Oc that is the application part of the force.

Note that, to detect only the force components in the Z-axis direction of the force applied to the pressure sensing device 1, one ring-shaped strain sensitive material 11 formed in a zig-zag pattern may be arranged in the inner ring-shaped region RG1, and one ring-shaped strain sensitive material 11 formed in a zig-zag pattern may be arranged in the outer ring-shaped region RG2. In this case, the resistance values of the two ring-shaped strain sensitive materials 11 can be equal to each other, and reference resistors with the same resistance value may be provided on the outside. The strain sensitive materials 11 and the resistors can provide bridge circuits to detect the force components in the Z-axis direction of the force applied to the pressure sensing device 1.

Note that, to detect only the force components in the X-axis direction of the force applied to the pressure sensing device 1, the strain sensitive materials 11 formed in a zig-zag pattern can be arranged in the inner ring-shaped region RG1, and the strain sensitive materials 11 formed in a zig-zag pattern can be arranged in the outer ring-shaped region RG2 in each of two semicircular regions obtained by dividing the surface portion 10a of the plate-shaped member 10 into two regions in the X-axis direction.

Similarly, to detect only the force components in the Y-axis direction of the force applied to the pressure sensing device 1, the strain sensitive materials 11 can be arranged in the inner ring-shaped region RG1, and the strain sensitive materials 11 can be arranged in the outer ring-shaped region RG2 in each of two semicircular regions obtained by dividing the surface portion 10a of the plate-shaped member 10 into two regions in the X-axis direction.

The circumferential direction of the plate-shaped member 10 of the strain sensitive material 11 may not be accurately arranged in the circumferential direction in the inner ring-shaped region RG1 and the outer ring-shaped region RG2 of the plate-shaped member 10, and the circumferential direction may be arranged in a direction intersecting the circumferential direction.

In other words, the circumferential direction of the plate-shaped member 10 of the strain sensitive material 11 may not be in a direction orthogonal to the radial direction around the center position Oc that is the application part of the force in the pressure sensing device 1. The circumferential direction may be deviated by an angle of up to 90 degrees toward a positive direction or a negative direction with respect to the direction of strain generated in the radial direction around the application part of the force, where the clockwise direction is the positive direction, for example.

Although the strain sensitive materials are arranged only on one surface portion of the pressure sensing device in the embodiment, the strain sensitive materials may be arranged on both one surface portion and another surface portion. In that case, the strain sensitive materials for detecting the strain in the Z-axis direction may be arranged on the one surface portion, and the strain sensitive materials for detecting the strain in the X-axis direction and the Y-axis direction may be arranged on the other surface portion, for example.

Although the plate-shaped member 10 of the pressure sensing device 1 contains SUS in the embodiment, it is obvious that the plate-shaped member 10 is not limited to SUS, and other elastic materials may be used.

It is obvious that the conductive material of the strain sensitive materials 11 is not limited to Cu or Cu—Ni alloy.

Although all of the resistance values when there is no strain are the same in the four strain sensitive materials arranged in each of the divided regions SX1, SX2, SY1, and SY2, the resistance values of the strain sensitive materials may not be the same. In principle, resistance values satisfying an equilibrium condition of bridge circuit can be set, such as an equilibrium condition of RX1·RX2=RX3·RX4, where the bridge circuit includes the strain sensitive materials X1, X2, X3, and X4, and the resistance values when there is no strain are RX1, RX2, RX3, and RX4, respectively, in FIG. 4. In this case, when there is no strain, the output voltages of the output electrode tO(−) and the output electrode tO(+) are equal, and the output voltage as a difference between the output voltages is zero.

The circuits formed along with the strain sensitive materials on the surface portion 10a of the plate-shaped member 10 of the pressure sensing device may be part of the bridge circuits instead of all of the bridge circuits. The circuits formed along with the strain sensitive materials are not limited to the bridge circuits, and the circuits may be any circuits that use the strain sensitive materials to detect the strain corresponding to the applied force.

The plate-shaped member 10 of the pressure sensing device may be a polygonal plate-shaped member instead of the circular plate, and the ring-shaped regions in that case may also be polygonal.

Although the plate-shaped member 10 of the pressure sensing device has a constant thickness, the thickness may vary in the radial direction around the application part of force. For example, to facilitate the strain deformation, the thickness near the parts provided with the strain sensitive materials may be thinner than the other parts in the inner ring-shaped region RG1 and the outer ring-shaped region RG2 in the case of the pressure sensing device 1 of the embodiment.

Although the core body 31 contains SUS in the embodiment, the core body 31 is not limited to SUS, and the core body 31 may contain any hard material, such as resin. Although the force reception portion coupled to the plate-shaped member 10 of the pressure sensing device 1 is the core body 31 in the stylus of the embodiment, a force transmission member may be coupled to the core body 31 in the axial direction to provide a force reception portion, and the force transmission member and the plate-shaped member 10 of the pressure sensing device 1 may be coupled.

Although the surface portion 10a of the plate-shaped member 10 of the pressure sensing device 1 is the surface portion on the side opposite to the pen tip side in the embodiment, the surface portion 10a of the plate-shaped member 10 may be the surface portion on the pen tip side, and the surface portion 10a may be coupled to the force reception portion.

Although the stylus of the embodiment is an electromagnetic resonance stylus, the system of the stylus according to the present disclosure may be a capacitive coupling system or any other system in which the strain sensitive materials are used in the pressure sensing device to detect the force applied to the pen tip portion.

Although the strain sensitive materials 11 are arranged only on the surface portion 10a of the plate-shaped member 10 in the pressure sensing device 1 of the embodiment, the strain sensitive materials may also be arranged on the other surface portion 10b of the plate-shaped member 10. For example, the strain sensitive materials for detecting the force in the Z-axis direction may be provided on the surface portion 10a of the plate-shaped member 10, and the strain sensitive materials for detecting the force in the X-axis direction and the Y-axis direction may be provided on the other surface portion 10b.

In this case, the circumferential direction may be divided into four regions as in the pressure sensing device of the embodiment, and four strain sensitive materials may be arranged in each of the divided regions SX1, SX2, SY1, and SY2 on the other surface portion 10b. Two strain sensitive materials 11 may be arranged in the inner ring-shaped region RG1, and two strain sensitive materials 11 may be arranged in the outer ring-shaped region RG2 of two semicircular regions on the surface portion 10a. One ring-shaped strain sensitive material 11 may be arranged in the inner ring-shaped region RG1, and one ring-shaped strain sensitive material 11 may be arranged in the outer ring-shaped region RG2.

Although the strain sensitive materials and the conductive pattern are directly formed on the plate-shaped member in the pressure sensing device of the embodiment, it is obvious that the strain sensitive materials and the conductive pattern may be formed as described above on a flexible board corresponding to the shape of the plate-shaped member, and the flexible board may be glued to the surface portion of the plate-shaped body.

Note that other than the strain gauge formed by depositing the strain sensitive materials on one surface of the plate-shaped member as in the embodiment, there is also a strain gauge in which, for example, the strain sensitive materials are deposited on a gauge base member, such as a resin film, and the gauge base member is attached to an elastic body, such as a plate-shaped member, through an adhesive.

In the strain gauge of the type in which the gauge base member, such as a resin film, is glued to the elastic body through an adhesive after depositing the strain sensitive materials on the gauge base member, the change over time (creep) in the strain sensitive characteristics influenced by the gauge base member and the adhesive is compensated by folded parts (folded tabs) in the zig-zag pattern. Note that the creep is a phenomenon that the amount of deviation changes over time.

The elastic body and the strain gauge have creep characteristics corresponding to the hardness (Young's modulus). The creep of the strain gauge is caused by the gauge base material (quality and thickness) and the adhesive.

For example, when the load applied to the elastic body is removed, the elastic body containing, for example, metal with high hardness is changed to restore the strain due to the creep characteristics corresponding to the hardness. On the other hand, the strain gauge is changed slower than the elastic body and returns to the original state due to the creep characteristics corresponding to the hardness of the resin film softer than the elastic body. Therefore, there is a phenomenon that the output of the strain gauge has not returned to zero yet even when the deviation of the elastic body has returned to zero.

Therefore, when the strain gauge of this type is used, the folded parts of the strain gauge in the zig-zag pattern are generally adjusted. The existence of the folded parts suppresses the slow change of the strain gauge. The strain gauge is changed according to the restoration of the elastic body, and the strain gauge returns to the original state. The creep is compensated in this way.

Figure 10A:
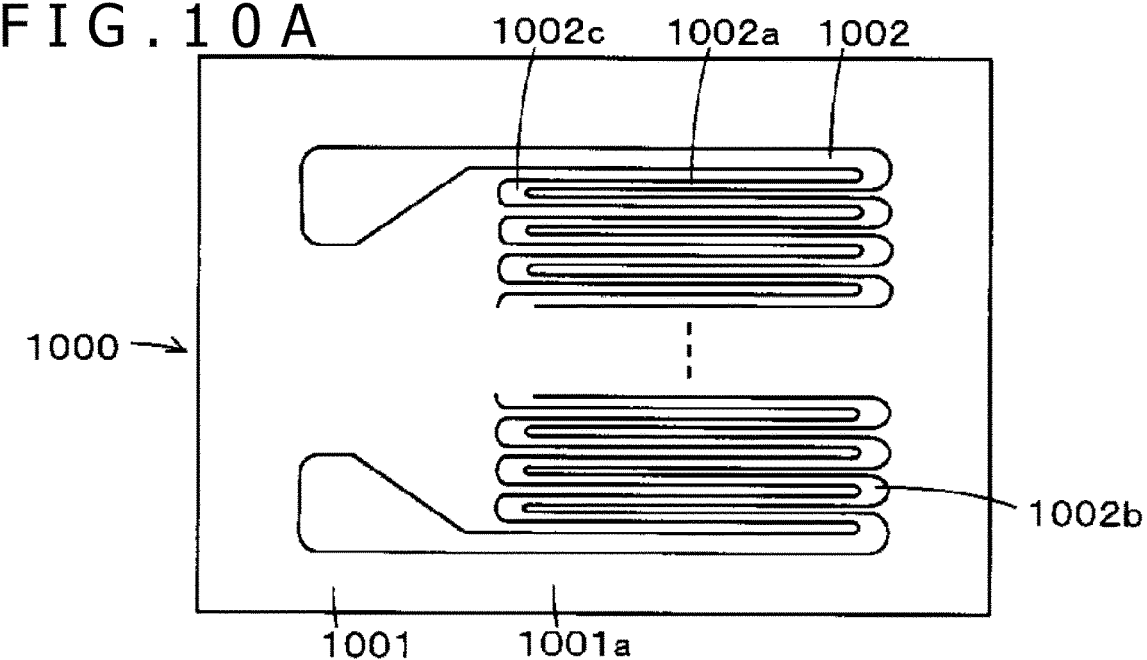
FIGS. 10A and 10B are diagrams for describing creep compensation of the pressure sensing device.

More specifically, FIG. 10A illustrates an example of a strain gauge 1000 in a zig-zag pattern. A strain sensitive material 1002 is deposited on a surface 1001a of a gauge base member 1001 including, for example, a resin film. The strain sensitive material 1002 includes a linear part 1002a and folded parts 1002b and 1002c at both ends of the linear part 1002a. Although not illustrated, an adhesive is provided on a surface of the gauge base member 1001 on the side opposite to the surface 1001*a*.

Figure 10B:
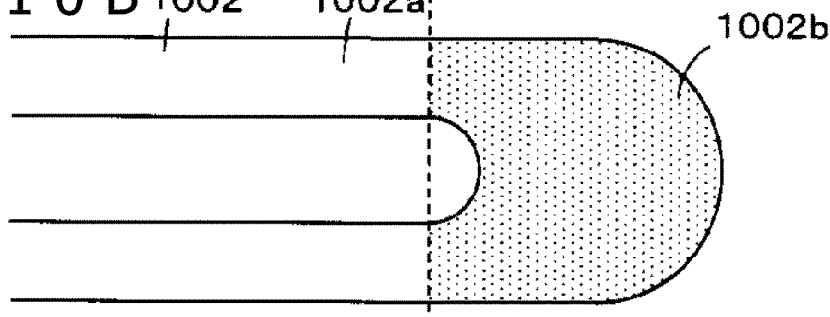

FIG. 10B illustrates one of the folded parts 1002*b* of the strain sensitive material 1002 in a zig-zag pattern. The folded part 1002*b* is halftoned in FIG. 10B. The length and the area of the folded part 1002*b* are selected to suppress the slow change of the strain gauge, so that the strain gauge is changed according to the restoration of the elastic body. The creep is compensated in this way.

Although the example of the creep phenomenon when the load applied to the elastic body has disappeared has been described, the creep phenomenon similarly occurs when the load is applied, and the creep is similarly compensated by the folded parts in a zig-zag pattern.

However, it is found out that the creep compensation by the folded parts is effective when the film thickness of the strain sensitive materials is thicker than a predetermined thickness, such as 1 µm, and the creep compensation is not effective in a strain gauge provided with strain sensitive materials including thin films with the film thickness of equal to or smaller than 1 µm.

Figure 11A:
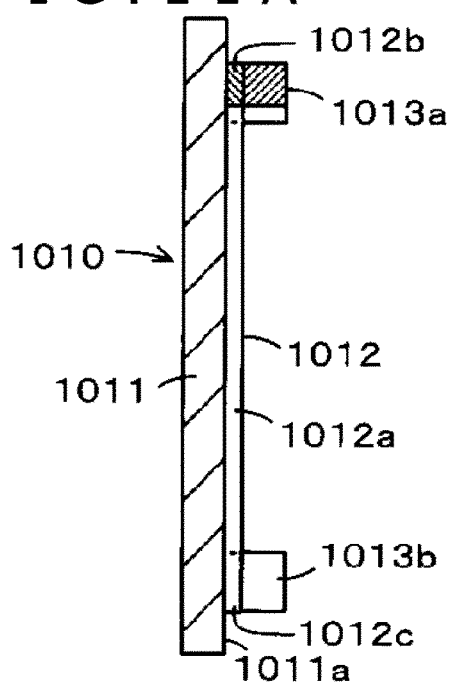
FIGS. 11A and 11B are diagrams for describing creep compensation of the pressure sensing device.
Figure 11B:
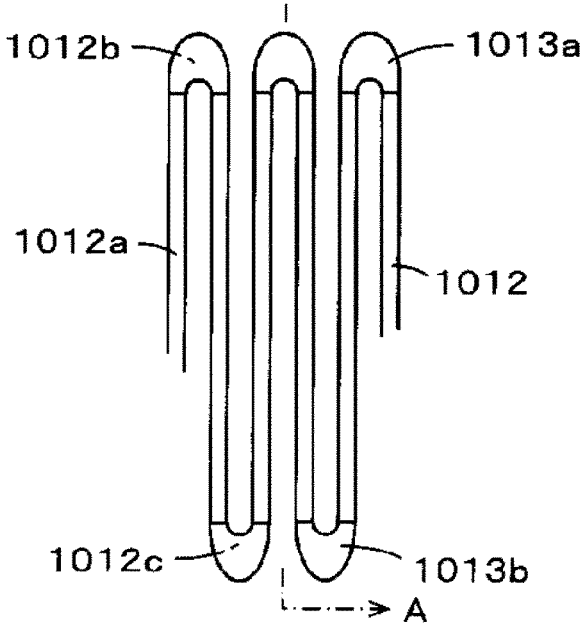

An example of a strain gauge remedying the problem will be described with reference to FIGS. 11A and 11B. FIG. 11A is a cross-sectional view of a strain gauge 1010 in the example. FIG. 11B is a diagram of part of a strain sensitive material 1012 of the strain gauge 1010 of the example as viewed in the direction orthogonal to a surface 1011*a* of a gauge base member 1011 provided with the strain sensitive material 1012. Note that FIG. 11A corresponds to a cross-sectional view along line A-A in FIG. 11B.

In the strain gauge 1010 of the example, a thin film of the strain sensitive material 1012 is formed by, for example, vapor deposition on the surface 1011*a* of the gauge base member 1011 containing resin. In the example, the film thickness of the strain sensitive material 1012 is, for example, approximately several hundred nanometers. In this example, the strain sensitive material 1012 including the thin film includes a linear part 1012*a* and folded parts 1012*b* and 1012*c* at both ends of the linear part 1012*a*. Although not illustrated, an adhesive is provided on a surface of the gauge base member 1011 on the side opposite to the surface 1011*a*.

In the strain gauge 1010 of the example, additional conductor layers 1013*a* and 1013*b* containing a conductive material with hardness equivalent to or larger than the hardness of the gauge base member 1011 are formed on the folded parts 1012*b* and 1012*c* of the strain sensitive material 1012 in the example. The thickness of the additional conductor layers 1013*a* and 1013*b* is 1 µm or more, preferably, 5 µm or more.

The additional conductor layers 1013*a* and 1013*b* may be formed by, for example, vapor deposition of metal conductor layers containing gold, nickel, or the like on the folded parts 1012*b* and 1012*c* of the strain sensitive material 1012. The additional conductor layers 1013*a* and 1013*b* may be formed as metal plate layers, such as gold plates and nickel plates. The additional conductor layers 1013*a* and 1013*b* may include solder or the like.

According to the strain gauge 1010 of the example configured as described above, even if the strain sensitive material 1012 includes a thin film with a film thickness of equal to smaller than 1 µm, the thickness of the folded parts 1012*b* and 1012*c* is a thickness equal to or greater than 1 µm due to the additional conductor layers 1013*a* and 1013*b*. Therefore, according to the strain gauge 1010 of the example, the creep can be compensated by the folded parts 1012*b* and 1012*c* of the strain sensitive material 1012.

It is to be noted that the embodiments of the present disclosure are not limited to the foregoing embodiments, and that various changes can be made without departing from the spirit of the present disclosure.

What is claimed is:

1. A pressure sensing device housed in a housing of a stylus in a pen shape, the stylus including a tip portion protruding from an end of the housing and a predetermined circuit, the pressure sensing device configured to sense force applied to the tip portion, the pressure sensing device housed in the housing of the stylus and electrically connected to the predetermined circuit, the pressure sensing device comprising:
    a plate-shaped member;
    a plurality of strain sensitive materials arranged on the plate-shaped member; and
    a connection electrode electrically connected to the predetermined circuit,
wherein:
    the plate-shaped member includes a surface portion having a center portion that receives force applied to the tip portion,
    the plurality of strain sensitive materials include at least a first strain sensitive material separated by a first distance from the center portion of the surface portion of the plate-shaped member, and a second strain sensitive material separated by a second distance larger than the first distance from the center portion of the surface portion of the plate-shaped member, the strain sensitive materials are formed on at least part of the surface portion of the plate-shaped member along with a conductive pattern that connects the first strain sensitive material and the second strain sensitive material, and the strain sensitive materials are configured to detect strain generated in the plate-shaped member according to the force transmitted to the surface portion of the plate-shaped member, and
    the connection electrode is electrically connected to the plurality of strain sensitive materials, and the connection electrode is crimped and electrically connected to the predetermined circuit housed in the stylus.

2. The pressure sensing device according to claim 1, wherein:
    the connection electrode is arranged at a position with less strain than strain generated at positions of the first strain sensitive material and the second strain sensitive material arranged on the surface portion of the plate-shaped member.

3. The pressure sensing device according to claim 1, wherein,
    on the plate-shaped member, the first strain sensitive material, the second strain sensitive material, and the conductive pattern are formed on an insulating layer.

4. The pressure sensing device according to claim 1, wherein:
    the first strain sensitive material separated by the first distance from the center portion of the surface portion of the plate-shaped member is arranged along a circumferential direction of the surface portion of the plate-shaped member separated by the first distance, and
    the second strain sensitive material separated by the second distance from the center portion of the surface portion of the plate-shaped member is arranged along the circumferential direction of the surface portion of the plate-shaped member separated by the second distance.

5. The pressure sensing device according to claim 1, wherein:
a resistance value of each of the first strain sensitive material and the second strain sensitive material changes according to the detected strain, and the first strain sensitive material and the second strain sensitive material provide a bridge circuit on the surface portion of the plate-shaped member.

6. The pressure sensing device according to claim 4, wherein:
the first strain sensitive material and a third strain sensitive material are arranged along the circumferential direction of the surface portion of the plate-shaped member separated by the first distance, the second strain sensitive material and a fourth strain sensitive material are arranged along the circumferential direction of the surface portion of the plate-shaped member separated by the second distance from the center of the force transmitted to the surface portion of the plate-shaped member, and the first strain sensitive material, the second strain sensitive material, the third strain sensitive material, and the fourth strain sensitive material are electrically connected to provide a bridge circuit.

7. The pressure sensing device according to claim 6, wherein:
the surface portion of the plate-shaped member is divided in the circumferential direction into N areas (N is an integer equal to or greater than two), and the bridge circuit is formed in each of the areas.

8. The pressure sensing device according to claim 1, wherein:
elongation strain and shrinkage strain are generated in the plate-shaped member according to an application of the force transmitted to the surface portion of the plate-shaped member, and
the first strain sensitive material and the second strain sensitive material are arranged according to positions where the elongation strain and the shrinkage strain are generated.

9. The pressure sensing device according to claim 1, wherein:
the first strain sensitive material and the second strain sensitive material are aligned in a radial direction around the center portion of the plate-shaped member.

10. A stylus in a pen shape, the stylus comprising:
a tip portion protruding from an end of a housing;
a pressure sensing device configured to sense force applied to the tip portion; and
a predetermined circuit electrically connected to the pressure sensing device, wherein:
the pressure sensing device includes a plate-shaped member, a plurality of strain sensitive materials arranged on the plate-shaped member, and a connection electrode electrically connected to the predetermined circuit,
the plate-shaped member includes a surface portion that receives force applied to the tip portion,
the plurality of strain sensitive materials include at least a first strain sensitive material separated by a first distance from the center portion of the surface portion of the plate-shaped member, and a second strain sensitive material separated by a second distance larger than the first distance from the center portion of the surface portion of the plate-shaped member,
the strain sensitive materials are formed on at least part of the surface portion of the plate-shaped member along with a conductive pattern that connects the first strain sensitive material and the second strain sensitive material, and the plurality of strain sensitive materials are configured to detect strain generated in the plate-shaped member according to the force transmitted to the surface portion of the plate-shaped member, and
the connection electrode is electrically connected to the plurality of strain sensitive materials, and the connection electrode is crimped and electrically connected along an axial direction of the stylus to the predetermined circuit housed in the stylus.

11. The stylus according to claim 10, wherein:
the connection electrode is arranged at a position with less strain than strain generated at positions of the first strain sensitive material and the second strain sensitive material arranged on the surface portion of the plate-shaped member.

12. The stylus according to claim 10, wherein,
on the plate-shaped member, the first strain sensitive material, the second strain sensitive material, and the conductive pattern are formed on an insulating layer.

13. The stylus according to claim 10, wherein:
the first strain sensitive material separated by the first distance from the center portion of the surface portion of the plate-shaped member is arranged along a circumferential direction of the surface portion of the plate-shaped member separated by the first distance, and the second strain sensitive material separated by the second distance from the center portion of the surface portion of the plate-shaped member is arranged along the circumferential direction of the surface portion of the plate-shaped member separated by the second distance.

* * * * *